US007793326B2

(12) United States Patent
McCoskey et al.

(10) Patent No.: US 7,793,326 B2
(45) Date of Patent: Sep. 7, 2010

(54) VIDEO AND DIGITAL MULTIMEDIA AGGREGATOR

(75) Inventors: John S. McCoskey, Castle Rock, CO (US); William D. Swart, Fairfax, VA (US); Michael L. Asmussen, Oak Hill, VA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1754 days.

(21) Appl. No.: 09/920,723

(22) Filed: Aug. 3, 2001

(65) Prior Publication Data
US 2003/0028889 A1 Feb. 6, 2003

(51) Int. Cl.
G06F 3/00 (2006.01)
G06F 13/00 (2006.01)
G06F 7/00 (2006.01)
G06F 17/30 (2006.01)
H04N 7/173 (2006.01)
H04N 5/445 (2006.01)

(52) U.S. Cl. .............................. 725/91; 725/53; 707/1; 707/2; 707/3; 707/4; 707/6

(58) Field of Classification Search ................... 725/91, 725/53; 707/1–6
See application file for complete search history.

(56) References Cited

U.S. PATENT DOCUMENTS

| 4,450,481 A | 5/1984 | Dickinson |
| 4,677,685 A | 6/1987 | Kurisu |
| 4,797,918 A | 1/1989 | Lee |
| 4,860,379 A | 8/1989 | Schoeneberger |
| 5,253,275 A | 10/1993 | Yurt |
| 5,270,809 A | 12/1993 | Gammie |
| 5,317,391 A | 5/1994 | Banker |
| 5,446,919 A | 8/1995 | Wilkins |
| 5,485,197 A | 1/1996 | Hoarty |
| 5,550,863 A | 8/1996 | Yurt |
| 5,600,364 A | 2/1997 | Hendricks |

(Continued)

FOREIGN PATENT DOCUMENTS

EP 0691787 1/1996

(Continued)

OTHER PUBLICATIONS

Henry Chadwick et al., "Digital Audio-Visual Council", TV Anytime and TV Anywhere, Dec. 1999, pp. 1-140.

(Continued)

Primary Examiner—Dominic D Saltarelli
(74) Attorney, Agent, or Firm—Banner & Witcoff, Ltd

(57) ABSTRACT

The present invention utilizes an aggregator for searching, packaging and delivering content. The aggregator processes requests, searches, provides search results and acquires content. The aggregator, operating in a communications network, includes a request and results processing server, a search engine server coupled to the request and results processing server and a content acquisition server coupled to the request and results processing server. A request and results processing server receives a request for content, the search engine server searches for the content and the content acquisition program acquires content for delivery to the user. The request and results processing server includes a search request processor that receives information related to a user's search request and provides the information to a search results form builder that creates an electronic search request.

50 Claims, 28 Drawing Sheets

U.S. PATENT DOCUMENTS

| | | | |
|---|---|---|---|
| 5,600,573 A * | 2/1997 | Hendricks et al. | 725/109 |
| 5,608,447 A | 3/1997 | Farry | |
| 5,798,785 A | 8/1998 | Hendricks et al. | 348/1 |
| 5,806,061 A * | 9/1998 | Chaudhuri et al. | 707/3 |
| 5,818,511 A | 10/1998 | Farry | |
| 5,835,087 A | 11/1998 | Herz | |
| 5,855,020 A * | 12/1998 | Kirsch | 707/10 |
| 5,864,546 A | 1/1999 | Campanella | |
| 5,909,638 A * | 6/1999 | Allen | 725/146 |
| 5,917,537 A | 6/1999 | Lightfoot | |
| 5,956,716 A * | 9/1999 | Kenner et al. | 707/10 |
| 5,986,690 A | 11/1999 | Hendricks | 348/7 |
| 6,088,732 A | 7/2000 | Smith | |
| 6,094,680 A * | 7/2000 | Hokanson | 709/223 |
| 6,119,154 A | 9/2000 | Weaver | |
| 6,141,693 A | 10/2000 | Perlman | |
| 6,201,536 B1 | 3/2001 | Hendricks | |
| 6,219,839 B1 | 4/2001 | Sampsell | |
| 6,243,713 B1 * | 6/2001 | Nelson et al. | 707/104.1 |
| 6,312,336 B1 * | 11/2001 | Handelman et al. | 463/40 |
| 6,331,877 B1 | 12/2001 | Bennington | |
| 6,547,829 B1 | 4/2003 | Meyerzon | |
| 6,694,352 B1 | 2/2004 | Omoigui | |
| 6,751,612 B1 | 6/2004 | Schuetze | |
| 6,772,150 B1 * | 8/2004 | Whitman et al. | 707/6 |
| 6,839,705 B1 * | 1/2005 | Grooters | 707/4 |
| 7,150,031 B1 | 12/2006 | Rodriguez | |
| 2001/0027557 A1 * | 10/2001 | Shinkawa et al. | 725/1 |
| 2001/0037498 A1 | 11/2001 | Johansson | |
| 2001/0039546 A1 * | 11/2001 | Moore et al. | 707/10 |
| 2002/0010682 A1 | 1/2002 | Johnson | |
| 2002/0026496 A1 | 2/2002 | Boyer | |
| 2002/0032740 A1 | 3/2002 | Stern | |
| 2002/0038308 A1 * | 3/2002 | Cappi | 707/104.1 |
| 2002/0059610 A1 | 5/2002 | Ellis | |
| 2002/0065812 A1 * | 5/2002 | Keith, Jr. | 707/3 |
| 2002/0099697 A1 | 7/2002 | Jensen-Grey | |
| 2005/0138660 A1 | 6/2005 | Boyer et al. | |
| 2005/0235200 A1 | 10/2005 | Maze et al. | |

FOREIGN PATENT DOCUMENTS

| | | |
|---|---|---|
| EP | 0961490 | 12/1999 |
| EP | 0992922 | 4/2000 |
| EP | 1049305 | 11/2000 |
| EP | 1133088 | 9/2001 |
| EP | 1143728 | 10/2001 |
| GB | 2330429 | 4/1999 |
| GB | 2343095 | 4/2000 |
| GB | 2358938 | 8/2001 |
| JP | 2000-013779 | 1/2000 |
| JP | 2001119681 | 4/2001 |
| WO | 99/14947 | 3/1999 |
| WO | 99/17549 | 4/1999 |
| WO | 00/08855 | 2/2000 |
| WO | 00/27122 | 5/2000 |
| WO | 00/28733 | 5/2000 |

OTHER PUBLICATIONS

Sergey Brin et al., "The Anatomy of a Large-Scale Hypertextual Web Search Engine", Aug. 3, 2001, pp. 1-19.

Chadwick, Henry, et al., "DAVIC—Digital Audio-Visual Council", TV Anytime and TV anywhere, December 1999, pp. 1-140.

Office Action in JP Application No. P2003-535456, dated Mar. 17, 2009, with translation.

Supplementary Partial EP Search Report in EP Application No. 02778473, dated Oct. 25, 2005.

Supplementary EP Search Report in EP Application No. 02784096, dated Oct. 13, 2005.

Written Opinion in PCT Application No. PCT/US02/32756, dated Aug. 13, 2004.

International Preliminary Examination Report in PCT Application No. PCT/US02/32756, dated Feb. 17, 2005.

Office Action in JP Application No. P2003-537297, dated Mar. 17, 2009, with translation.

Office Action in JP Application No. P2003-537297, dated Nov. 17, 2009, with translation.

Supplementary EP Search Report in EP Application No. 02778472, dated Oct. 7, 2005.

Office Action in EP Application No. 02778472.7, dated Feb. 15, 2010.

Office Action in EP Application No. 02784096.6, dated Mar. 26, 2010.

* cited by examiner

Figure 18a

Search Request Form

- User Identification and Authorization Information
  - Account administrator User Identification
  - Current user's User Identification
  - Account's wide area distribution network address
  - Account authorization code
  - Account password
  - Current user password
  - Account public encryption key
  - Restrictions or controls placed on current user by account administrator
  - Digital rights management parameters
  - Preferred content format information
  - Current hardware configuration

- Reserved for future use

- User Administration and Billing Information
  - Updated account user information
    - User ID added to or deleted from account
    - Password changes
    - Changes to user terminal equipment
    - Reserved for future use
  - Updated account billing information
    - Updated bank or credit card information for billing
    - Selection of different service level or package
    - Reserved for future use
  - Privacy preferences
    - List of data elements to be updated or added to account's historical database file
    - List of data elements to be removed or erased from historical file
    - General user historical data usage parameters
    - Reserved for future use

- Reserved for future use

*Figure 18b*

Search Request Form (cont'd)

- Search Request Qualification
  - Search request initiation time
  - List of search request content types (video, audio, software, text, ebook, etc.)
  - Search request time limit (leave open, one time only, active for specified amount of time)
  - Does user want suggested content search and results returned? (yes / no)
  - Does user want search parameters to be stored in user profile for future reference by user or aggregator system

- Reserved for future use

- Search Request Criteria
  - Content Type: Audio / Video Programming
    - Program Type
    - Program title
    - Title keywords
    - Genre
    - Program topic or subject
    - Program description keywords
    - Format
    - Source
    - Language
    - Geographical origin
    - Cast
    - Director
    - Setting
    - Request for critical review information
    - Request for user rating and download popularity
    - Date and time parameters
    - Preferred content provider list
    - Free form user input

- Reserved for future use

Figure 18c

Search Request Form (cont'd)

- Search Request Criteria (cont'd)
  - Content Type: Computer Software
    - Program Type
    - Program title
    - Title keywords
    - Software category
    - Description keywords
    - Format and operating system
    - Source
    - Request for critical review information
    - Request for user rating and download popularity
    - Preferred content provider list
    - Free form user input
    - Reserved for future use

- Content Type: Text / Electronic Books
    - Book or text type
    - Title
    - Title keywords
    - Author
    - Genre
    - Topic or subject
    - Publisher
    - Description keywords
    - Format
    - Language
    - Geographical origin
    - Setting
    - Request for critical review information
    - Request for user rating and download popularity
    - Preferred content provider list
    - Free form user input
    - Reserved for future use

- Reserved for future use

Figure 19a

Search Results Form

- User Identification and Authorization Information
  - Account administrator User Identification
  - Current user's User Identification
  - Account's wide area distribution network address
  - Account authorization code
  - Account password
  - Current user password
  - Account public encryption key
  - Search request form refernece identification and timestamp

- Reserved for future use

- Advertising Information
  - List of ads to be inserted in results GUI
  - Location of ads to be inserted
  - Digital files of ads that are not yet stored in user's terminal

- Reserved for future use

Figure 19b

Search Results Form (cont'd)

- Search Results Information
    - Number of user search result entries returned
    - Number of suggested search results entries returned
    - Duration of search
    - Number of sites, channels, records, and keywords searched

- Reserved for future use

- Search Result Entries (each entry contians the following)
    - Identification as a result of User or Suggested search criteria
    - Content Type: Audio / Video Programming, software, ebooks, etc.
    - Content Metadata
        - Type, title, genre, topic or subject, description, format, language, geographical origin, cast, director, author, publisher, copyright data, story setting, date, critical review information, user ratings and download statistics, etc.
    - Program schedule and availability information
    - Source information (cable channel, website, software company, e-commerce fulfillment provider, ebook seller, etc.)
    - Digital content format and coding information
    - Delivery options
    - Programming content duration, file size, download time, etc.
    - Digital Rights Management information (user rights, allowances, restrictions, tracking data, etc)
    - Billing information, fees, etc.
    - Information required to initiate download request
        - Source routing data
        - Storage location
        - Streaming information, identification
        - Download authorization code (or authentication data to obtain download authorization at time of download request)
        - Reserved for future use

- Reserved for future use

VIDEO AND DIGITAL MULTIMEDIA AGGREGATOR

RELATED APPLICATIONS

The following U.S. Patents also are incorporated by reference:

U.S. Pat. No. 5,798,785, entitled "Terminal for Suggesting Programs Offered on a Television Program Delivery System;"

U.S. Pat. No. 5,986,690, entitled "Electronic Book Selection and Delivery System;"

The following co-pending U.S. patent applications also are incorporated by reference:

patent application Ser. No. 07/991,074, filed Dec. 9, 1992, entitled "Remote Control for Menu Driven Subscriber Access to Television Programming;"

patent application Ser. No. 08/906,469, filed Aug. 5, 1997, entitled "Reprogrammable Terminal for Suggesting Programs Offered on a Television Program Delivery System;"

patent application Ser. No. 09/191,520, filed Nov. 13, 1998, entitled "Digital Broadcast Program Ordering;"

patent application Ser. No. 09/289,957, filed Apr. 13, 1999, entitled "Electronic Book Alternative Delivery Systems;"

patent application Ser. No. 09/289,956, filed Apr. 13, 1999, entitled "Electronic Book Alternative Delivery Methods;" and patent application entitled "Video and Digital Multimedia Aggregator;" and patent application entitled "Video and Digital Multimedia Aggregator Remote Content Crawler," filed on date herein.

TECHNICAL FIELD

The technical field is television program and digital multimedia delivery systems that incorporate intelligent and flexible program search and delivery mechanisms.

BACKGROUND

Cable television delivery systems greatly expanded the array of programs available to television viewers over that provided by over-the-air broadcast systems. Subsequently, satellite television delivery systems, and in particular, digital satellite broadcast systems further expanded the viewing choices for consumers. In the near future, digital broadcast television systems will provide many more programming choices for consumers.

In addition to television programming delivered through television program delivery systems, other programs and events may be sent to consumers. These other programs and events include streaming video sent over wired and unwired, narrowband to broadband services, digital audio programs, and other multimedia data.

Unfortunately, customers are still limited in their television viewing choices by the local and regional nature of television delivery systems. For example, a broadcaster in Boston may provide programming of local interests to people in Massachusetts while a broadcaster in Seattle may provide different programming to people in the Seattle area. A person in Boston generally cannot access Seattle programming, other than programming that is provided at a national level.

In addition to this local/regional market segregation, many other sources of programming and events may not be available in a specific viewing area. These other sources may include audio programming, streaming video, local or closed circuit television programming (e.g., education television programming provided by a state education department) and other programming.

Even if certain programming is available in a local viewing area, a viewer may not be aware of its existence. This situation may be the result of a large array of available programming coupled with a limited program menu or guide. The program guide may be limited in that not all available programming can be listed, some programming changes occur that are not reflected in the program guide, and errors may exist in the program guide. In addition, the more comprehensive the program guide, the harder it is for the viewer to search and navigate the program guide to find a desired program.

SUMMARY

The problems noted above are solved by the video and digital multimedia aggregator system and method described herein. Program content can be packaged and delivered by the system, including video, television, radio, audio, multimedia, computer software, and electronic books, or any content that can be delivered in digital format.

A system for searching, packaging and delivering content using an aggregator is described. The aggregator processes requests, searches, provides search results and acquires content.

The aggregator comprises a request and results processing server, a search engine server coupled to the request and results processing server and a content acquisition server coupled to the request and results processing server. The request and results processing server receives a request for a program, the search engine server searches for the program and the content acquisition server acquires a program for delivery to the user. The request and results processing server includes a search request processor that receives information related to the user's search request and provides the information to a search results form builder that creates an electronic search request. The search request may be augmented by using a content search suggestion engine to add additional search terms and descriptions to the search request. The aggregator may also include a decoder that decodes program content and program metadata from remote sources for storage at the aggregator, and an encoder that encodes content metadata and programs for delivery to the user. The aggregator may also comprise one or more crawlers, such as a content crawler, to look for program content in the digital communications network.

The search engine server searches at least a local content database. The local database typically comprises at least two file types, metadata and content. A content file includes a complete program content file. For example, the 1997 movie Titanic may exist in the local content database as a complete program content file. The complete program content file may also include a reference content or metadata that contains additional information related to the content. Such additional information in the reference content may include: a program description, including program rating, program description, video clips, program length, format (e.g., 4×3 television or 16×9 movies), and other information; billing information and digital rights management information; viewing statistics, including number of times viewed, dates/times viewed, identity of users viewing the program; advertisement information to allow ads to be inserted during viewing of the program; and other information.

The additional information in the reference file may be provided in whole or in part to the system users. For example, the aggregator may provide a program description and accompanying video clips to selected systems users. The reference file may also be used by the aggregator for system administration purposes. For example, billing and digital rights management information may be used to collect appropriate fees from system users and to provide such collected fees to the entities owning rights in the content.

A remote content crawler continually crawls the digital communication network looking for content to provide to the aggregator. The content provided to the aggregator may be stored in a form of an entire content file. For example, the content may include an entire movie, television program or electronic book. Alternatively, the content provided to the aggregator may be a reference to a content file that is stored at, or that will be available at one of the remote locations. For example, the content may be a reference to a future, scheduled live sports event that will be made available to system users. The sports event may be provided for a one time fee, as part of a sports package, for which a fee is collected, or as a free event. In the examples discussed above, the content may be stored at the aggregator, and may subsequently be provided to system users. For the example of the live sports event, the aggregator may store the live sports event and may then provide the sports event as a replay, in addition to facilitating live viewing of the sports event.

DESCRIPTION OF THE DRAWINGS

The detailed description will refer to the following drawings in which like numerals refer to like elements, and in which:

FIGS. 18A-18C show an embodiment of a search request form; and

FIGS. 19A-19B show an embodiment of a search results form.

DETAILED DESCRIPTION

Figure 1:
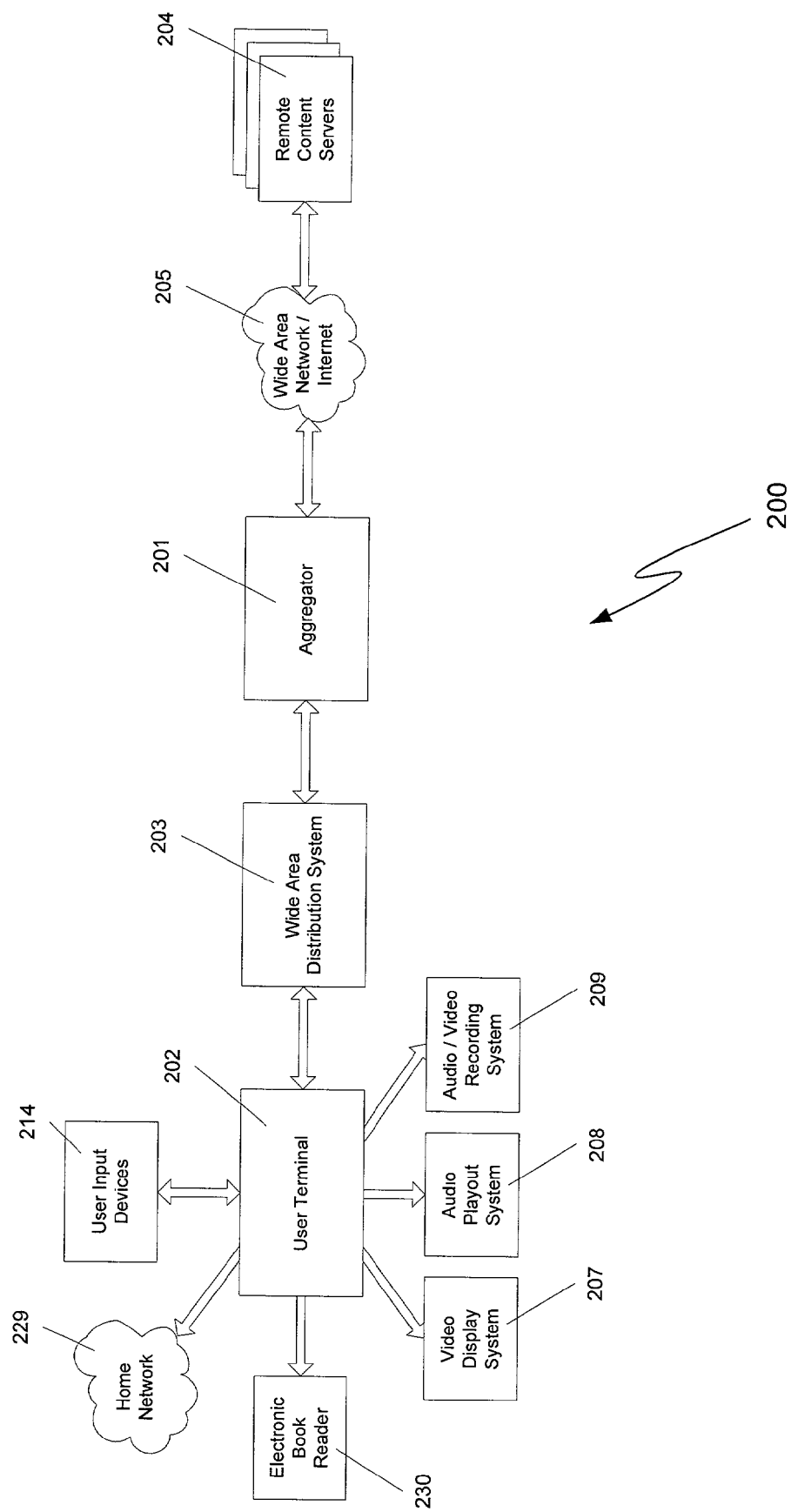
FIG. 1 is a block diagram of primary components of a content search, packaging, and delivery system.

FIG. 1 is a block diagram of a content search, packaging, and delivery system 200. The content to be packaged and delivered by the system 200 includes video, television, radio, audio, multimedia, computer software and electronic books. Components of the system 200 include an aggregator 201 and a user terminal 202, which are connected using a wide area distribution system 203. Other components are remote content servers 204 that exchange data with the aggregator 201 using a wide area network/Internet 205 connection. The user terminal 202 may incorporate a video display system 207, an audio playout system 208, an audio/video recording system 209, user input devices 214, an electronic book reader 230, and a connection to a home network 229 to interact with other devices in the user's home environment. Alternatively, one or more or all of the video display system 207, the audio playout system 208, the audio/video recording system 209, and the electronic book reader 230 may be separate components that are coupled to the user terminal 202.

Figure 4:
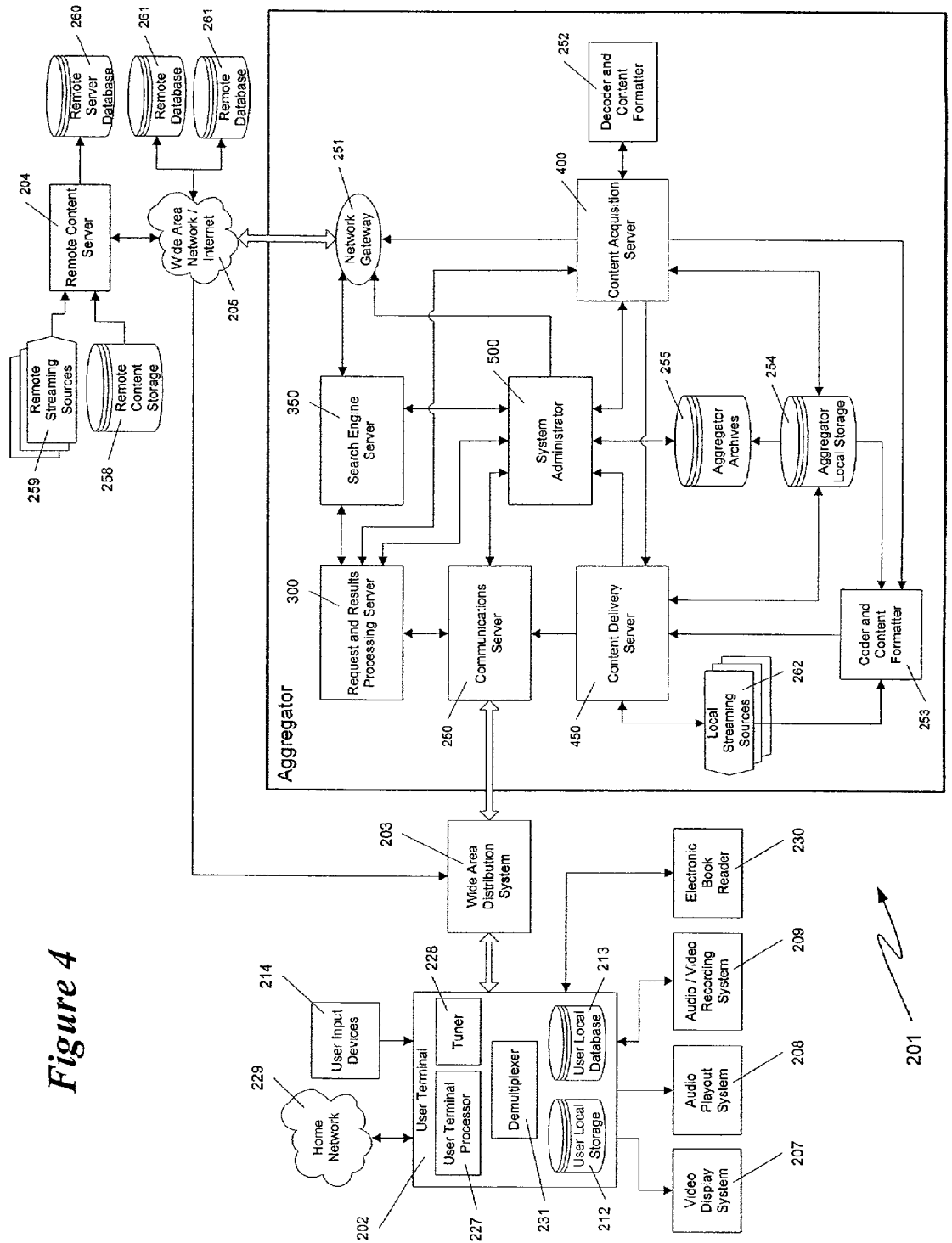
FIG. 4 is a schematic of the components of the content search, packaging, and delivery system showing subsystems of an aggregator, a user terminal, and a remote content server.

The system 200 allows a user to enter search parameters, such as keywords and category headings, and have the aggregator 201 use these parameters to locate, package, and deliver content to the user terminal 202 from numerous sources. The requests and content deliveries can be sent over communications links including, but not limited to, telephone lines, coaxial cable, fiber-optic cable, wireless connections, wide area networks, the Internet, and other communication media collectively represented by the wide area distribution system 203. The numerous sources of content are shown in FIG. 4 and include, but are not limited to, an aggregator local storage 254, local streaming sources 262, remote content storage 258, and remote streaming sources 259. In an embodiment, the local streaming sources 262 are comprised of the audio and video channels being delivered using a cable headend system that may house the aggregator 201.

The system 200 will take a user's search request and may perform a search of virtually every active and scheduled radio and television channel in the world, as well as archived sources of video and audio programming such as movies and recorded audio sources and sources of other multimedia, software, and electronic book content. In an embodiment, the system 200 will also search Internet Web sites and other online databases. The user will then be able to select programming or other content for download based on the search results. In an embodiment, the download, or delivery, process can be fulfilled by making the content available on a specific channel of a cable television system, or by transmitting the content using a digital communications protocol, such as the Internet standard TCP/IP, for example. In addition, the content search, packaging, and delivery system 200 is capable of formulating and presenting a list of suggested content based on an analysis of the user's current search parameters, stored information about previous searches and previously selected content downloads and other user-specific or related information. The system 200 is also capable of notifying a user prior to the start time of selected programming and availability of other content using such notification as an electronic mail message and/or an on-screen message indicating that the scheduled program will be broadcast at a specified time. The system 200 may support one or more digital rights management (DRM) systems to track the usage and copyrights rights associated with downloaded content and bill the user's account as appropriate and provide any license and usage fees to the content provider. The system 200 may implement a users' privacy protection scheme allowing users to control what information is gathered, limit what is done with that information, and review and delete the user's profile if desired.

Figure 2:
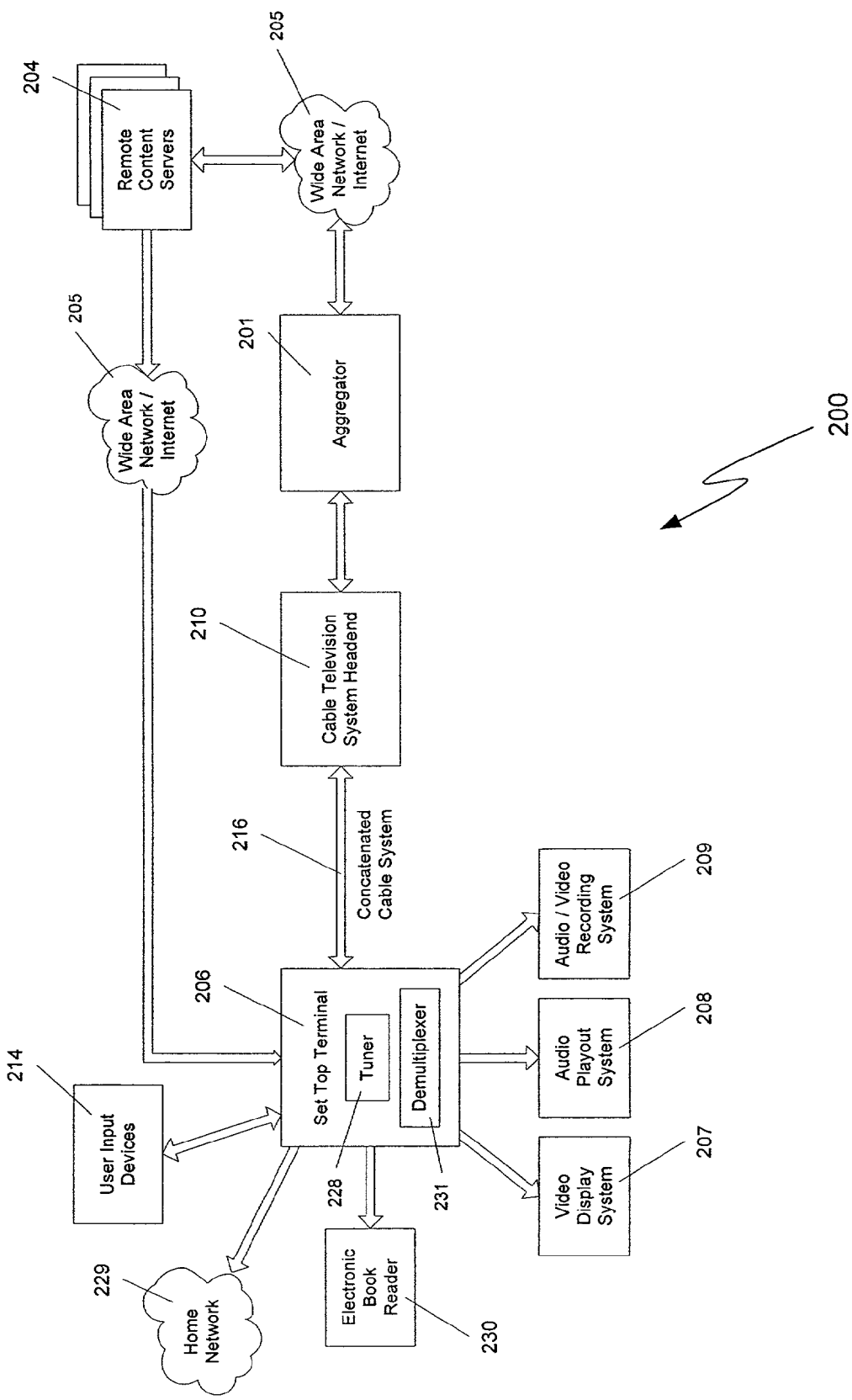
FIG. 2 is a block diagram of the components of the content search, packaging, and delivery system configured to deliver content to a set top terminal.

An overview of an embodiment of the system 200 is shown in FIG. 2 where the user terminal 202 is a set top terminal 206 that communicates with the aggregator 201 through a cable television system headend 210, thereby making use of the cable television system headend 210 high bandwidth concatenated cable system 216. Further, the set top terminal 206 system may include a tuner 228, a demultiplexer 231, the video display system 207, the audio playout system 208, the audio/video recording system 209, user input devices 214, an electronic book reader 230, and a connection to the user's home network 229. These components are used to tune, select, view, listen to, and store audio and video programming and other content delivered by the search, packaging, and delivery system 200. FIG. 2 also shows a communications path from one or more remote content servers 204 through the wide area network/Internet 205 directly to the set top terminal 206, which bypasses the aggregator 201 and cable television system headend 210. This path may be used in the case where the requested content is available in the required format from the remote content server 204 and is authorized for direct delivery to the user. In an alternative embodiment, the aggregator 201 is collocated with the cable television system headend 210 that is acting as the wide area distribution system 203 as is the case when a cable television system is also serving as the user's Internet service provider.

Figure 3:
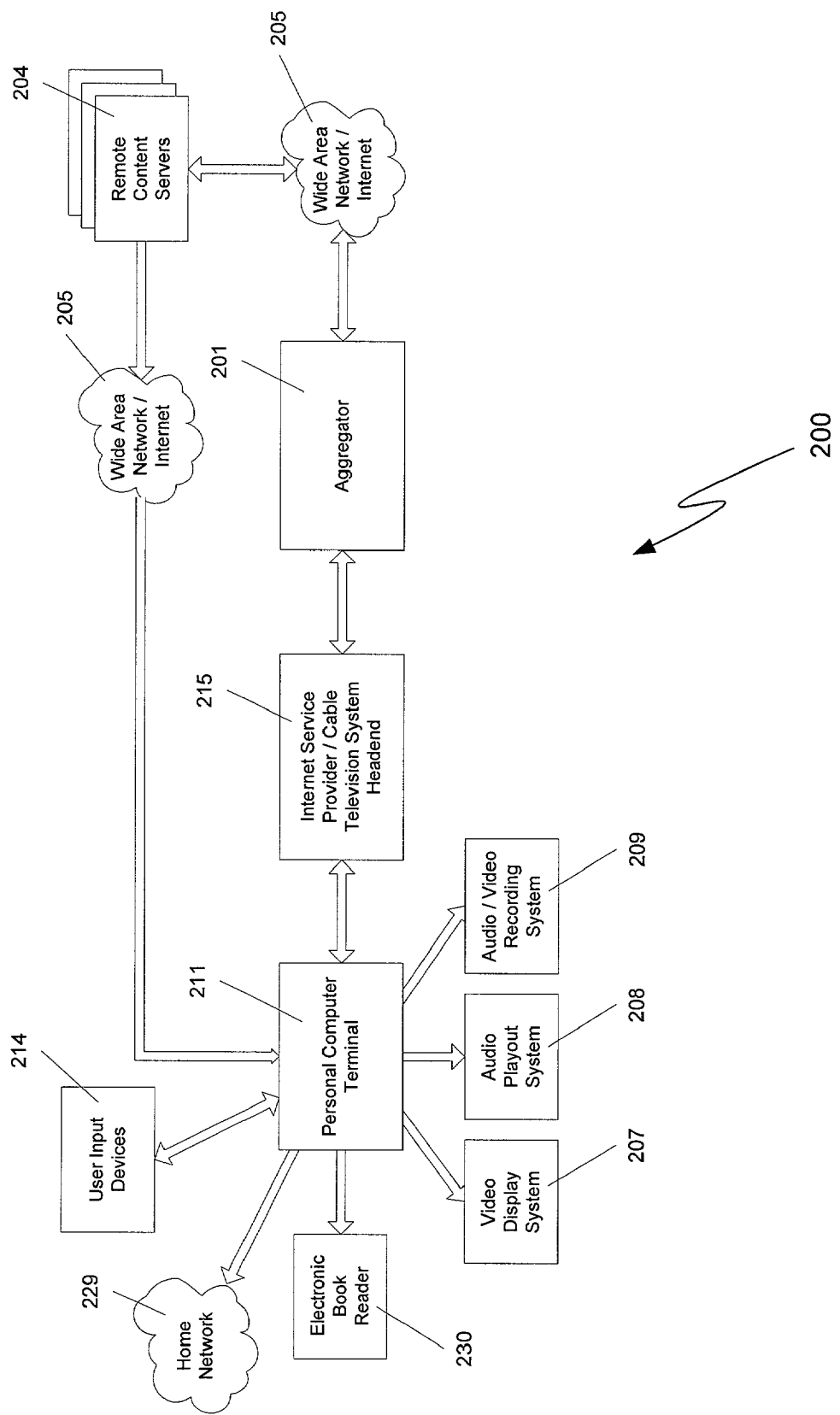
FIG. 3 is a block diagram of the components of the content search, packaging, and delivery system configured to deliver content to a personal computer terminal.

An overview of another embodiment of the system 200 is shown in FIG. 3, where the user terminal 202 is a personal computer terminal 211 that communicates with the aggregator 201 through an Internet service provider/cable television system headend 215. In this case, the content may be delivered by a cable headend that is operating as an Internet service provider (ISP). The personal computer terminal 211 also may include the video display system 207, the audio playout system 208, the audio/video recording system 209, user input devices 214, the electronic book reader 230, and the connection to the home network 229. A communications path also exists from one or more remote content servers 204 through the wide area network/Internet 205 directly to the personal computer terminal 211, which bypasses the aggregator 201 and the Internet service provider/cable television system headend 215 in the case where requested content is in the required format and is authorized for direct delivery to the user.

The user can receive video and audio programs (i.e., the content) in a number of different ways. First, the tuner 228 in the user terminal 202, shown in FIG. 2, can simply tune to the desired program, or the demultiplexer 231 can select a program from a digital multiplex, thereby displaying the program at the appropriate time. However, the desired program may not be broadcast by the user's cable television system headend 210, or the user would like to watch a program supplied by the local headend, but not subscribed to by the user, e.g., a boxing match broadcast by a premium channel that the user does not ordinarily receive. In these examples, the program can be delivered to the user by the aggregator 201 using the telephone lines, fiber-optic transmission lines, or other communication media, or using the cable television system headend 210. In an embodiment, the aggregator 201 can supply the desired program to the user by pulling programs from program delivery systems in the United States and abroad and delivering the program to system users. Therefore, a user can have access to programs outside the user's immediate viewing area.

FIG. 4 shows the system 200 and system components in more detail. At a user's location, the user terminal 202 includes the tuner 228, the demultiplexer 231, a user terminal processor 227, user local storage 212 and user local database 213. Coupled to the user terminal 202 may be user input devices 214, the video display system 207, the audio playout system 208, the audio/video recording system 209, an electronic book reader 230, and a connection to the home network 229.

The user terminal 202 is coupled through the wide area distribution system 203 to the aggregator 201 and further through the wide area network/Internet 205 to remote program sources. The remote program sources include remote streaming sources 259 and remote central storage 258. The remote program sources also include remote databases 261 and, through the remote content server 204, a remote server database 260.

The aggregator 201 may include a communications server 250 that communicates with the user terminal 202 through the wide area distribution system 203. The communications server 250 receives inputs from a request and results processing server 300, a content delivery server 450 and a system administrator 500. The content delivery server 450 receives inputs from a coder and content formatter 253 and a content acquisition server 400. The content delivery server 450 also accesses an aggregator local storage 254 and local streaming sources 262. Finally, the content delivery server 450 provides an output to the system administrator 500.

The coder and coder formatter 253 receives inputs from the content acquisition server 400, the aggregator local storage 254 and local streaming sources 262. The system administrator 500 receives inputs from the content and delivery server 450, and communicates with the content acquisition server 400, the request and results processing server 300, a search engine server 350 and aggregator archives 255. A decoder and content formatter 252 is coupled to the content acquisition server 400. Finally, a network gateway 251 couples components of the aggregator 201 with the remote content server 204 through the wide area network/Internet 205.

Programs received at the aggregator 201 may be input to the formatter 253. The formatter 253 reformats all input content into a format that is readily received by all user terminals 202 operably connected to the delivery system 200 (not shown in FIG. 4). In addition, the formatter 253 can store full or partial copies of content in compressed form in the aggregator local storage 254. Furthermore, the aggregator 201 can provide real-time delivery of certain content, such as a boxing match. In an embodiment, if a large number of users want a particular live program, then the cable television system headend 210 can broadcast the program on a particular channel available to all the requesters instead of broadcasting the program to each individual user over the wide area distribution system 203. See U.S. patent application Ser. No. 09/191,520, entitled Digital Broadcast Program Ordering, hereby incorporated by reference, for additional details of broadcast program delivery.

The aggregator 201 can also implement a screening process for limiting the number of programs captured to those programs with a viewing audience above a predetermined threshold. In effect, the aggregator 201 contains a filter that will pass only programs meeting the predetermined selection criteria. The filter may include programming that screens the content to reject specific items, such as adult content, for example.

The system administrator 500 records what fees should be paid and to whom. For example, the aggregator 201 will determine to whom any copyright or other fees should be paid when a program is broadcast.

The user terminal 202 may be a television, a set top terminal 206, a personal computer terminal 211 (not shown), or any device capable of receiving digital or analog data, or some combination thereof. The user terminal 202 is equipped with the user input devices 214 that communicate search criteria to the system 200 as well as navigate through the user terminal menu system and control the user terminal's other various functions. The user local storage 212 is used to store and archive content onto one or more removable and/or non-removable storage devices or media for later access. Removable storage media may include, but is not limited to, magnetic tape, magnetic disks, optical disks and modules, and electronic memory cartridges. The user local database 213 is the repository of all relevant information about a user's profile and account. This information includes, but is not limited to, user name, password, personal information that the user has authorized for storage, billing information, other users allowed access to the account, past search criteria, past content download information, and library information about stored content. As a consumer protection, the user terminal 202 may enable the account user to view the information stored in the user local database 213 and modify certain data fields and select which data fields may be reported to a main system database (see FIG. 10) within the aggregator 201. Certain fields including, but not limited to, account numbers and billing information may not be allowed this level of user access.

The user terminal processor 227 may include a central processing unit and all associated hardware, software, and firmware modules to perform all operations within the user terminal 202. These operations include, but are not limited to, managing communications with the aggregator 201 and other networked devices, processing search and download requests, displaying search and download results, managing and controlling communications with the user local storage 212 and the user local database 213, responding to user interaction with presentation of graphical user interface (GUI) menus, playing out selected programming content using various audio and video output devices, implementing the user's part of the digital rights management schema, and administering the user's account and billing. The tuner 228 and the demultiplexer 231 are used to select an audio/video channel for playout from the channels available on the cable television system 216.

In an embodiment, the user terminal 202 may incorporate selected features of the aggregator 201. For example, the user terminal 202 may include a small metadata crawler, an aggregator, and program content and program metadata storage.

The user terminal 202 communicates with the aggregator 201 using the wide area distribution system 203. Within the aggregator 201, the communications server 250 acts as the interface point to the wide area distribution system 203 for the purpose of managing primary communications to system users. The communications server 250 routes incoming user requests and associated user information to the request and results processing server 300, routes search results and content downloads through the wide area distribution system 203 to end users, and routes billing information from the customer billing server 506 (see FIG. 10) to the end users. The request and results processing server 300 performs the basic processing and routing related to user search requests, content download requests, administrative information requests, search results, related content suggestions, and programming notification.

Figure 5:
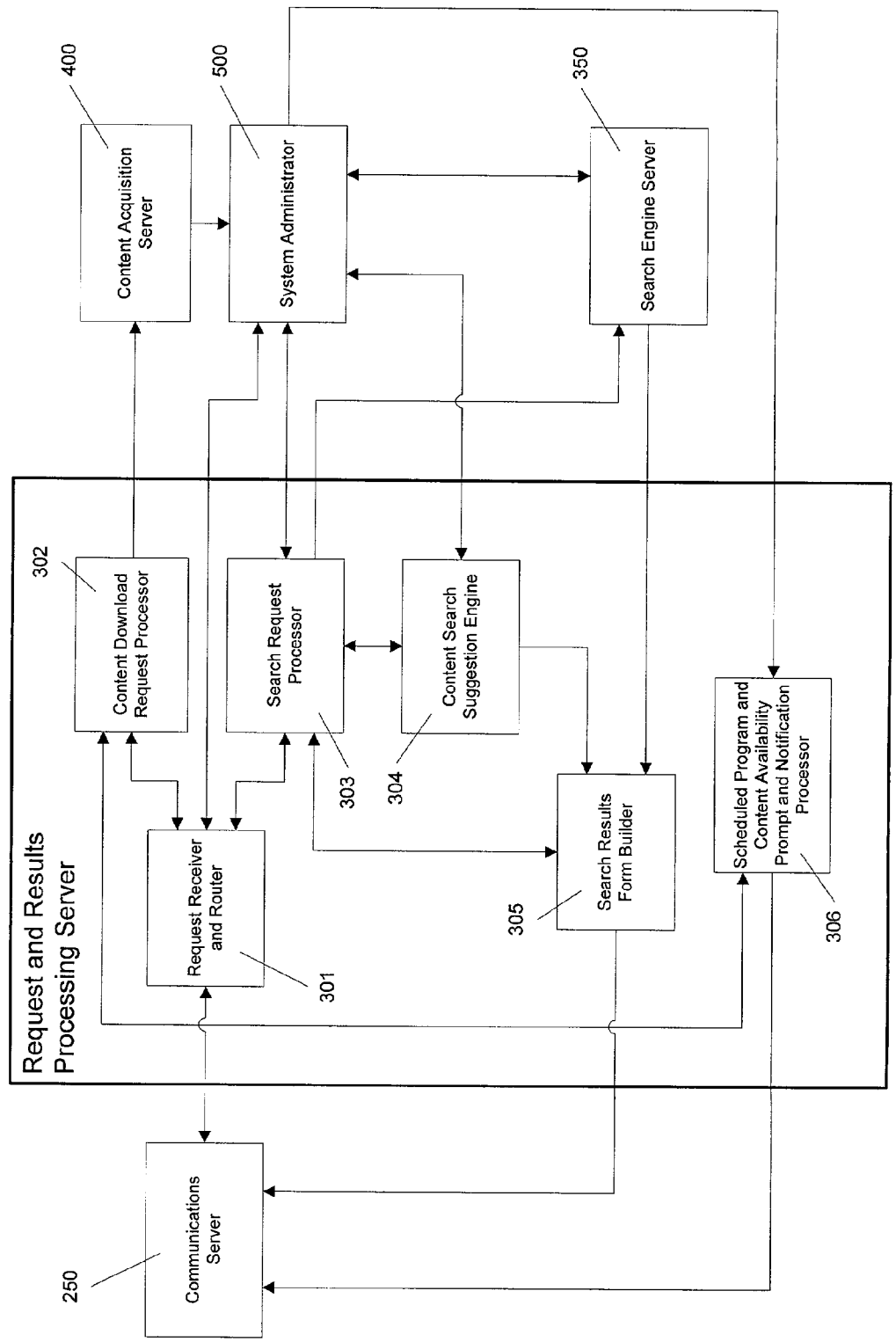
FIG. 5 is a schematic of subsystems of a request and results processing server and components with which the processing server interacts as part of the content search, packaging, and delivery system.

FIG. 5 shows individual subsystems of the request and results processing server 300. The types of requests from a system user include, but are not limited to, programming and other content search requests, content download requests based on results of an earlier search, and administrative information requests. Requests for administrative information may be automatically generated by the user terminal 202 or may be manually initiated by the system user. When an administrative request is received, a request receiver and router 301 opens a dialog with a database administrator 502 (see FIG. 10) within the system administrator 500, retrieves the requested system user's administrative data, and routes the data through the communications server 250 to the user terminal 202. Search requests and content download requests are routed to a search request processor 303 and a content download request processor 302, respectively. The processors 302 and 303 open a dialog with the database administrator 502 and verify that the user's request is authorized. If the user's request is not authorized, the processor (302 or 303) sends a message to the user through the request receiver and router 301 and the communications server 250 informing the user that the request is denied. The processor (302 or 303) then logs the event with the system administrator 500. If the request is authorized, the processor (302 or 303) formats the request as necessary and routes content download requests to the content acquisition server 400 and search requests to the search engine server 350.

For programming download requests, the content acquisition server 400 submits scheduling and availability information about the selected content to the database administrator 502 within the system administrator 500, which in turn routes this scheduling and availability information to a scheduled program and content availability prompt and notification processor 306 within the request and results processing server 300. The scheduled program and content availability prompt and notification processor 306 then initiates a form of prompt and/or notification to the user that the selected content is available at a particular time. This notification can be in various forms including, but not limited to, an on-screen pop-up window, audible notification, e-mail notification, instant message, and automated telephone notification. The exact form and timing of the prompt and/or notification may be customized by the user and may be based on whether the content is scheduled, continuously broadcast, stored, or available any time for download. In an embodiment, when a selected program is about to be broadcast or made available for viewing on television, a prompt will be sent by the server 300 notifying the user when the program is about to air. In the case of an on-screen prompt, a mechanism may be provided for enabling the user to hyperlink to the selected program from the prompt. For search requests, the search engine server 350 returns a data package to the request and results processing server 300 that contains scheduling, availability, and descriptive information about all content entries that have been determined to satisfy the search criteria.

Figure 6:
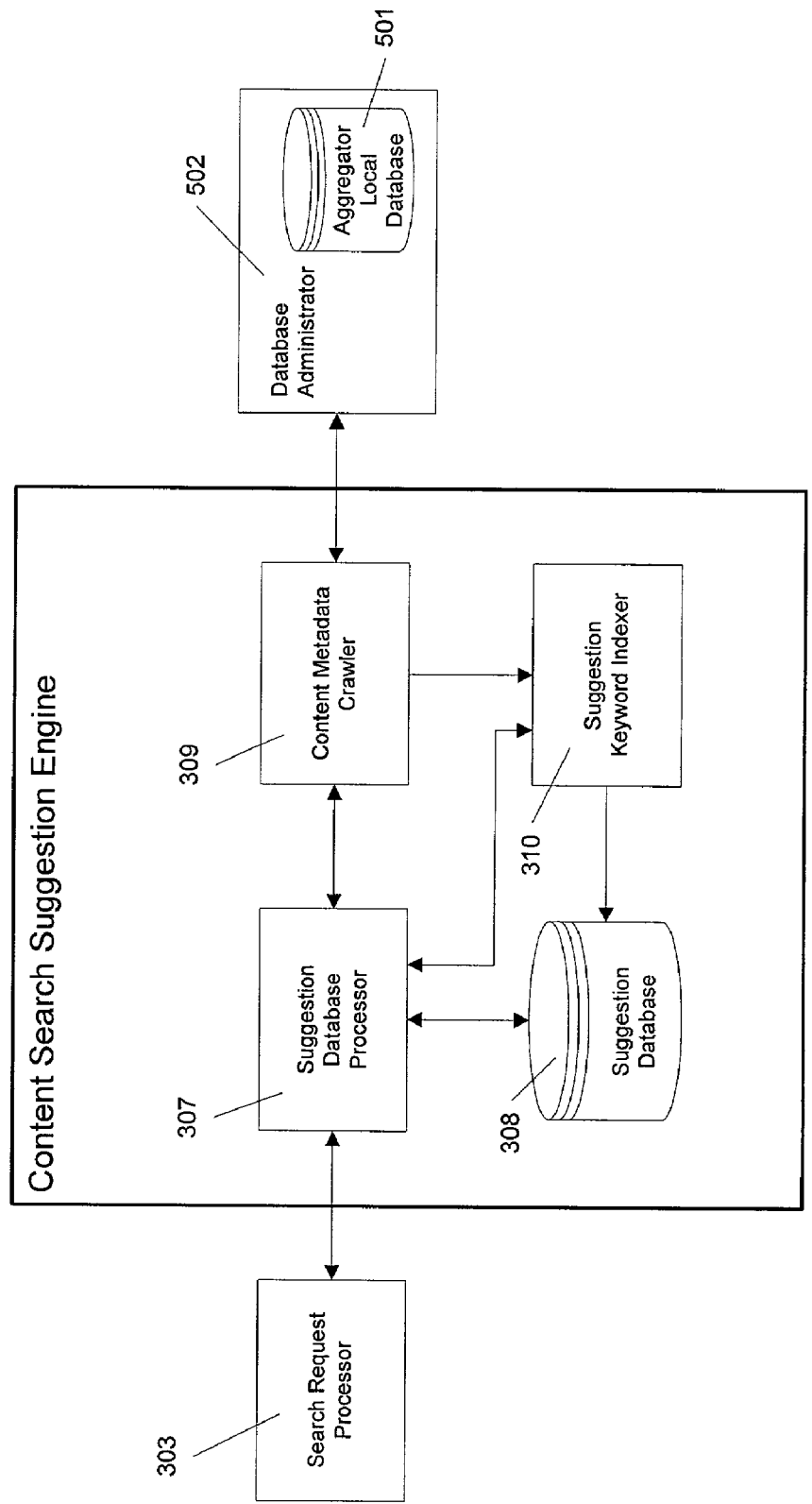
FIG. 6 is a schematic of subsystems of a content search suggestion engine and components with which the content search suggestion engine interacts as part of the content search, packaging, and delivery system.

In addition to searching for content containing criteria entered by a system user, a content search suggestion engine 304, in conjunction with the search engine server 350 will be able to suggest content to the user that is related in various ways, such as by category or theme. The content search suggestion engine 304 is shown in detail in FIG. 6. For example, if a user wishes to see programs about Titanic, the content search suggestion engine 304 may, in addition to suggesting programs about Titanic, suggest or inform the user of programs and other content such as electronic books about ships other than Titanic. Likewise, if the search criteria include Johnny Weismuller, an actor who starred in Tarzan movies, the content search suggestion engine 304 might suggest programs and other content about Tarzan featuring someone other than Johnny Weismuller. Furthermore, the content search suggestion engine 304 may suggest programs for viewing based on past search criteria entered by the user as well as information on content the user has actually downloaded. For example, if the search criteria includes Johnny Weismuller and the user has searched and/or downloaded numerous sports-related programming in the past, the content search suggestion engine 304 may suggest programming and other content including swimming competitions and sports history and biography programming as well as Tarzan movies and other content directly related to Johnny Weismuller such as the Jungle Patrol television series. If the user searched for and received Tarzan movies, the content search suggestion engine 304 might suggest electronic books by Edgar Rice Burroughs. Such electronic books could then be downloaded to the user terminal 202 using the wide area network/Intranet 205 bypassing the aggregator 201, or could be compiled at the aggregator 201 for delivery to the user terminal 202. Electronic book delivery systems are described in U.S. Pat. No. 5,986,690, entitled "Electronic Book Selection and Delivery System," to Hendricks, and in co-pending patent application Ser. Nos. 09/289,957, entitled "Electronic Book Alternative Delivery Systems," and 09/289,956, entitled "Electronic Book Alternative Delivery Methods," all of which are hereby incorporated by reference.

During submission of a content search request, the user may have the option of disabling the return of suggested content results if desired. In order to retrieve results for suggested programming, the content search suggestion engine 304 analyzes a search request form 618 (see FIGS. 18A-18C) received from the user terminal 202, and performs a search within a suggestion database 308 for additional search criteria to be used to find suggested content related in some way to the original search request results. These suggested search criteria are appended to the search request form 618 forming an augmented search request form 620 (FIGS. 18A-18C) when the search request form 618 is forwarded to the search engine server 350 in order for a suggested content list to be returned. U.S. Pat. No. 5,798,785 entitled "Terminal for Suggesting Programs Offered on a Television Program Delivery System," and co-pending patent application Ser. No. 08/906,469, filed Aug. 5, 1997, entitled "Reprogrammable Terminal for Suggesting Programs Offered on a Television Program Delivery System," both of which are hereby incorporated by reference, provide additional details on program suggestion.

The suggestion database processor 307 (shown in FIG. 6) conducts a search of the suggestion database 308 to find related search criteria to use to locate suggested content. The processor 307 also performs management functions for the other subsystems of the content search suggestion engine 304. When prompted by the suggestion database processor 307, the content metadata crawler 309 crawls, or intensively searches, the metadata in the aggregator local database 501 and passes a listing of all content metadata to the suggestion keyword indexer 310, which indexes each metadata element and assigns each with a vector quantity that describes the metadata element as a suggestion keyword associated with a particular content entity. The indexer 310 then populates the suggestion database 308 with these indexed suggestion keywords, which are used by the suggestion database processor 307 along with historical data relevant to the user to supply a list of suggested search terms. The search terms are then added to the search request form 618 to create an augmented search request form that is returned to the search request processor 303 (see FIG. 5).

Figure 7:
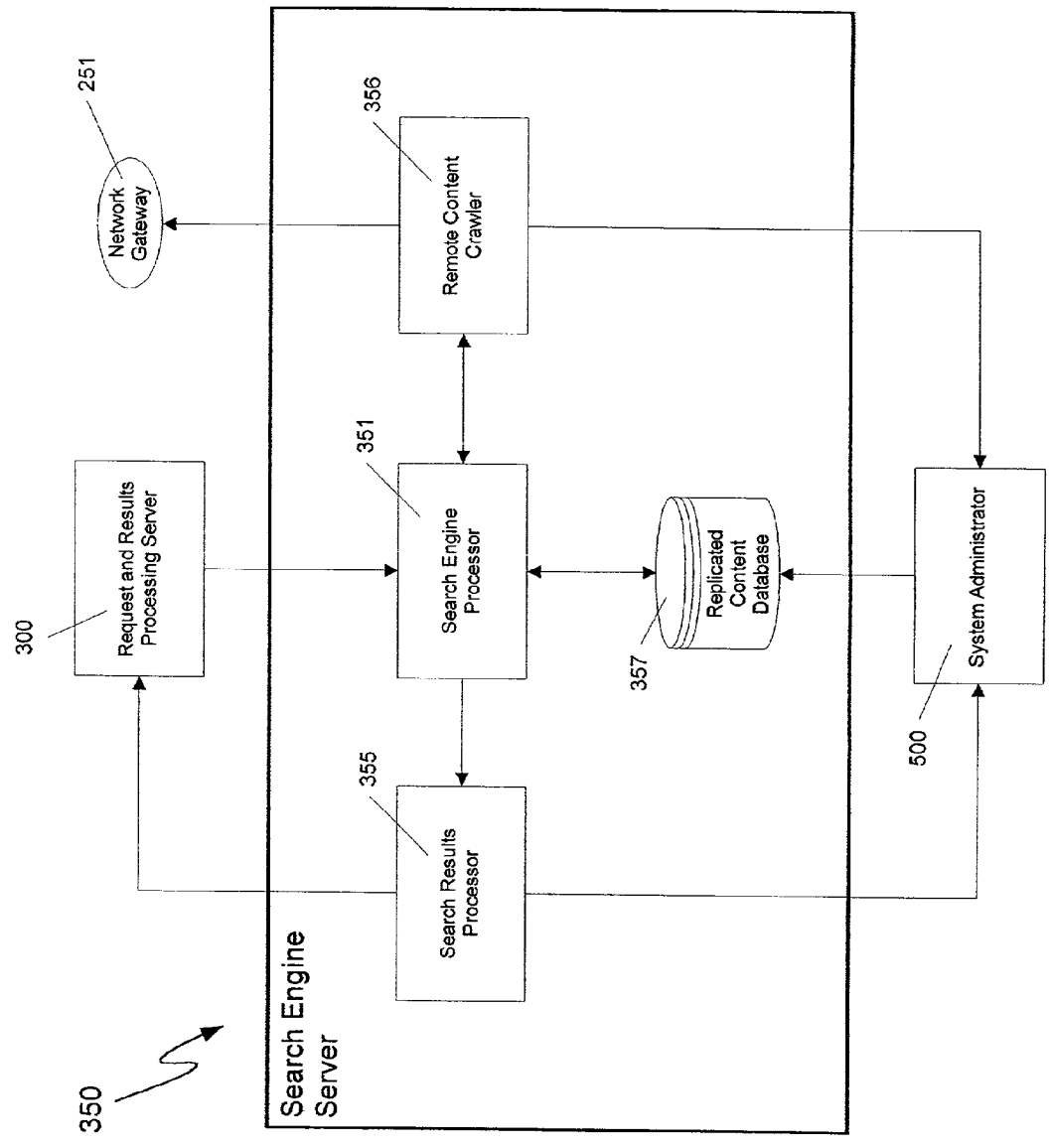
FIG. 7 is a schematic of subsystems of a search engine server and components with which the search engine server interacts as part of the content search, packaging, and delivery system.

The search engine server 350, shown in FIG. 7, receives the augmented search request form 620 and performs a search of the database of all known programming content, both local and remote, and builds a hierarchical list of results based on how well each result compared to the search criteria. The search engine server 350 contains a replicated content database 357 to be able to perform searches more efficiently and maintains a list of active searches to which new content listings are compared. Periodically, the search engine server 350 thoroughly searches, or crawls using a remote content crawler 356, all available sources of programming and other content, retrieves all information about all content not previously logged into the system and enters that data into the aggregator local database 501 (see FIG. 4). In an embodiment, the search engine server 350 may directly access remotely stored content and analyze and retrieve metadata from the stored digital files.

In an embodiment, the aggregator local database 501 and the search engine server 350 reside on an array of distributed processing and storage devices in order to reduce database access time and perform searches in parallel on different sections of the database. In another embodiment, numerous aggregators 201 can be operated by various stakeholders such as cable television headend operators. These aggregators 201 will be capable of networking directly together using the wide area network/Internet 205. Within this network of aggregators 201, business models will support various relationships between operators such as a peer-to-peer network of content, advertising, and user sharing. The aggregator 201 software and hardware components may be of a modular nature in order to support various system architectures as well as be scalable and easily upgraded on a module or subsystem basis.

Returning to FIG. 5, all search results, based on user search criteria and suggested search criteria, may be forwarded by the search engine server 350 and then to the search results form builder 305 within the request and results processing server 300. The search results form builder 305 formats the results for transmission through the communications server 250 to the user terminal 202. The search results form builder 305 takes prioritized lists of user search results and suggested search results and populates a search results form 674 (see FIGS. 19A and B) with programming, scheduling and availability information. The request and results processing server 300 then encrypts and forwards the search results form 674 through the communications server 250 to the user terminal 202. At the user terminal 202, the search results form 674 is decrypted and stored in the user local database 213 and a prompt is displayed that allows the user to display the returned results on the video display system 207 or the electronic book reader 230.

The search results can then be displayed on the user's video display system 207 in various formats including, but not limited to, a hierarchical listing based on relevance to search criteria and a display similar to an electronic program guide based on time of availability and content source. The user will be able to select from the various results display formats and have the results data be reformatted upon request. In an embodiment, the user may be able to select one of the search criteria or an attribute of the programming and the results will be sorted based on that selection. For example, if numerous program types are returned, the user can select "documentaries" and the results will be listed with documentary programs occurring first. The results display will also indicate whether a particular programming choice is a result of the user-defined search criteria or was a result of the system's capability to suggest content. The user will have the ability to display only results from the user search, only results from the suggested content search, or both. In an embodiment, the entire menu system can be implemented using audible prompts and lists in order to accommodate users with visual impairments. In such a scenario, input methods can be by voice recognition, tactile recognition such as a remote control equipped with a Braille character input pad, or a combination of these methods.

As shown in FIG. 4, the network gateway 251 serves as the communications system between the aggregator 201 and the wide area network/Internet 205, and hence the remote content server 204. The network gateway 251 may support any protocol in widespread use for connection to the wide area network/Internet 205 and will serve as a security firewall between the aggregator 201 and the wide area network/Internet 205. The network gateway 251 will route search and content download information from the aggregator 201 to the remote content server 204 and route search results and content from the remote content server 204 and other Internet sources back to the aggregator 201.

Figure 8:
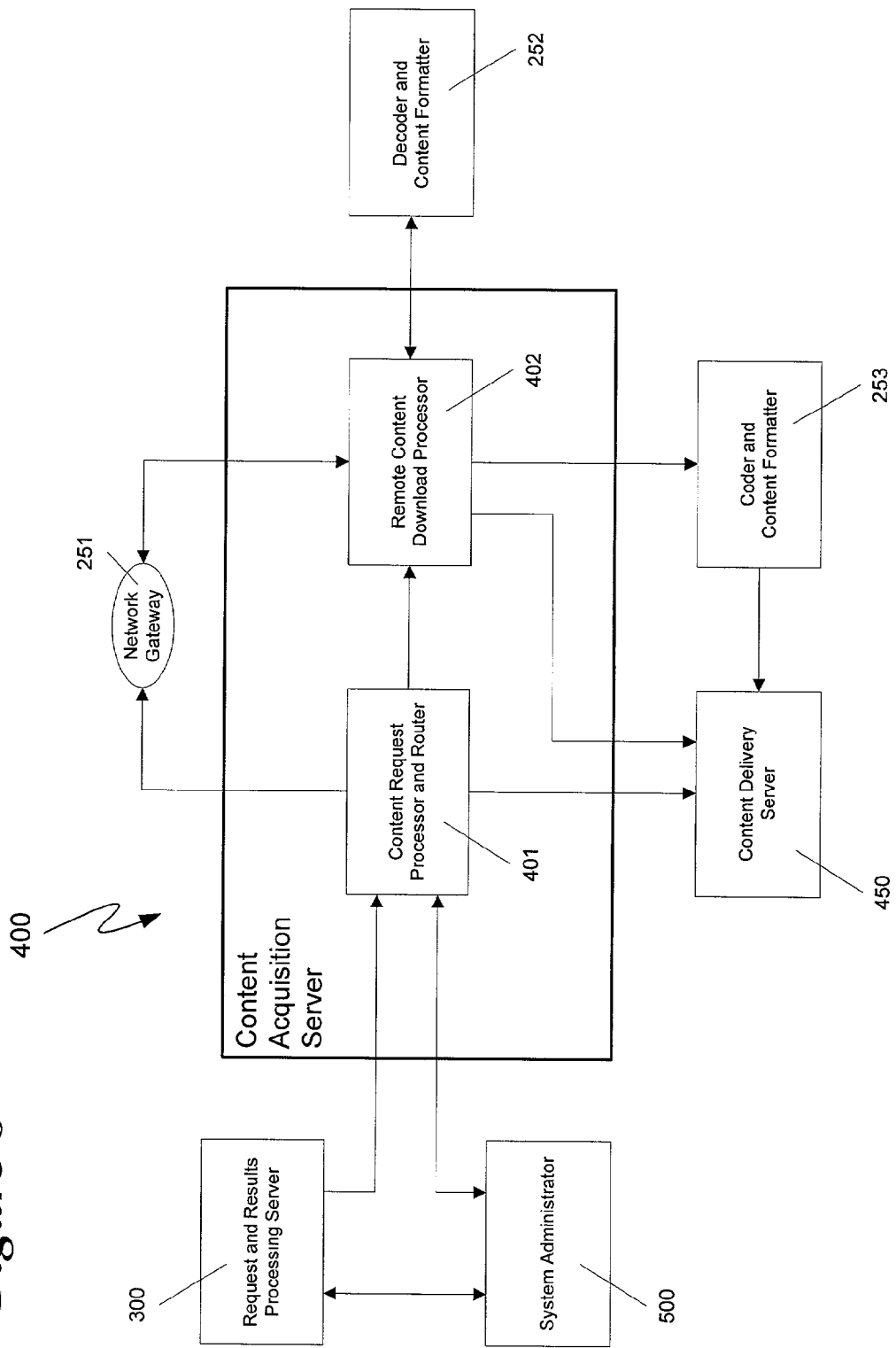
FIG. 8 is a schematic of subsystems of a content acquisition server and components with which the content acquisition server interacts as part of a content search, packaging, and delivery system.

The content acquisition server 400, as shown in detail in FIG. 8, receives content download requests from the request and results processing server 300. The content acquisition server 400 includes a content request processor and router 401 and a remote content download processor 402. A download request is made by the user for content selections from sources including, but not limited to, earlier programming searches, recurring scheduled events, an electronic program guide, lists of electronic books and computer software, advertisements, promotions, and affiliated Internet websites. In general, a download request will be accompanied by data indicating the source of the content and whether the content is local or remote. Requests for content that is available only from a remote site may be routed to the network gateway 251 and then to the appropriate remote source. Remote sources include, but are not limited to, the remote content storage 258 and the remote streaming sources 259 shown in FIG. 4. The remote content server 204 verifies the request and returns the content through the wide area network/Internet 205. If the programming content is in the appropriate format and is authorized for direct delivery to the user, the content may be routed through the wide area network/Internet 205 and the wide area distribution system 203 directly to the user terminal 202. During this transfer, administrative data pertaining to billing and verification of delivery are sent back to the aggregator 201.

Figure 9:
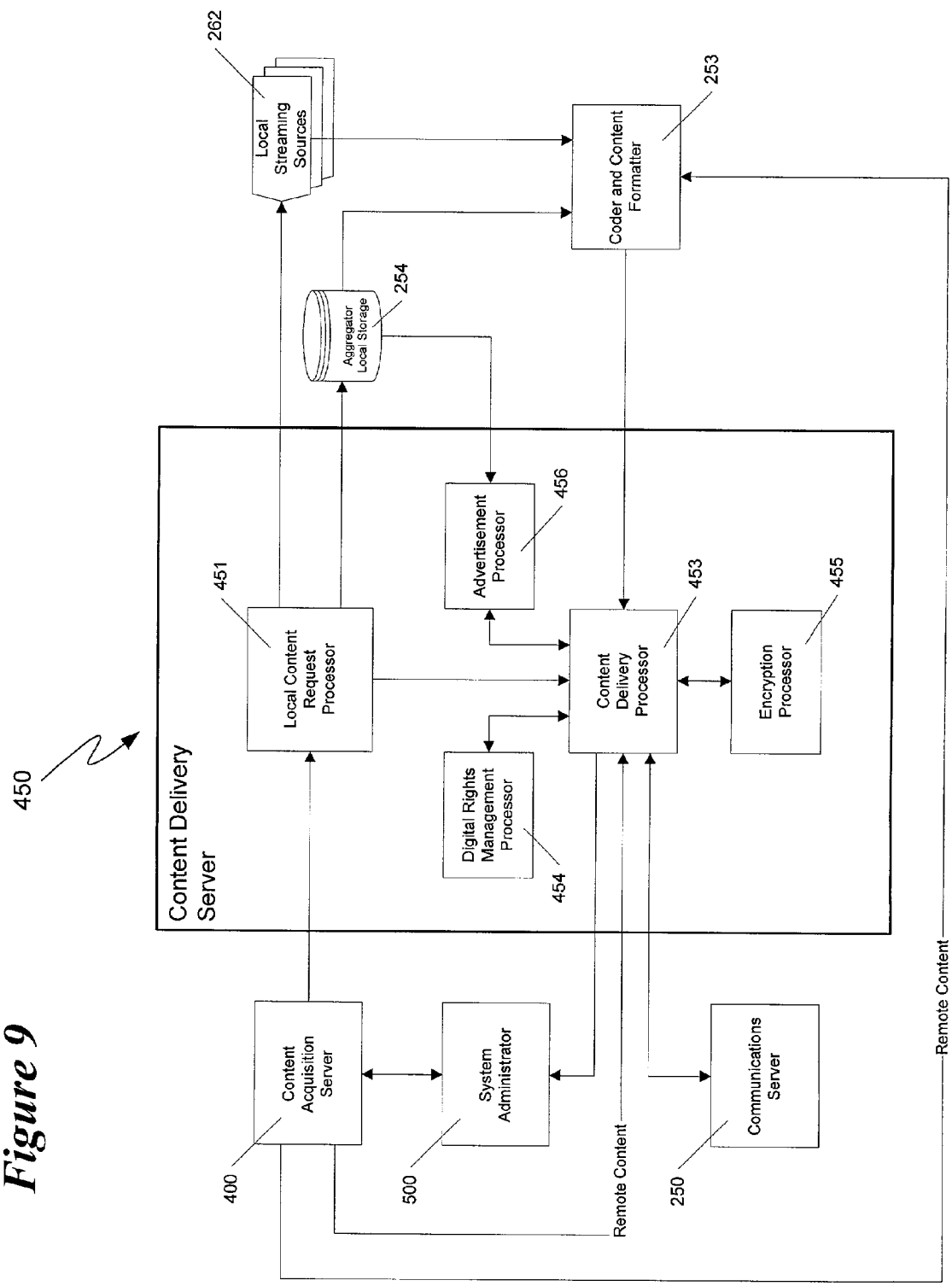
FIG. 9 is a schematic of subsystems of a content delivery server and components with which the content delivery server interacts as part of the content search, packaging, and delivery system.

Programming that is not formatted and authorized for direct delivery from a remote source may be transmitted through the network gateway 251 to the remote content download processor 402 contained within the content acquisition server 400. The remote content download processor 402 buffers or caches the programming content while managing the download connection to the remote source. The programming content is then routed to the decoder and content formatter 252, which may be capable of decoding various industry formats and compression schemes and may reformat and encode the decoded data and associated metadata into one or more preferred content formats for delivery and for local storage. The processed programming content, along with user identification and routing data, is then routed to the content delivery server 450, which then manages the delivery of the content through the communications server 250 and wide area distribution system 203 to the user terminal 202. The content delivery server 450 is shown in detail in FIG. 9.

Requests for programming available from a local source are routed directly to a local content request processor 451 within the content delivery server 450. The local content request processor 451 initiates delivery of content from local sources including, but not limited to, the aggregator local storage 254 and aggregator local streaming sources 262, and routes the content to the coder and content formatter 253. In an embodiment, the local streaming sources 262 can include any of the cable television channels available at the cable television system headend 210 housing the aggregator 201. If the programming content is not already in the user-requested format and coding scheme, the coder and content formatter 253 (see FIG. 4) performs content formatting and coding of the programming for delivery to the user. The content is then forwarded to a content delivery processor 453, which manages the delivery of the content through the communications server 250 and wide area distribution system 203 to the user terminal 202.

During the content acquisition and delivery process, the content delivery processor 453 oversees and validates that the delivered programming content matches the original content download request. This is done by receiving program and user metadata from the content acquisition server 400 through the local content request processor 451 and comparing the received data to the metadata of the actual requested content and the actual delivered content as received during the program request and download process. A confirmation is then logged with the system administrator 500. In an embodiment, based on user information and content metadata, the content delivery processor 453 can command an advertisement processor 456 to insert specific advertising into certain programming content as it is delivered to a system user. The advertising can be retrieved from the aggregator local storage 254 or can already be resident at the user terminal 202. Methods for targeting advertisements to users are described in co-pending patent application Ser. No. 09/054,419, entitled "Targeted Advertising Using Television Delivery Systems," and Ser. No. 08/160,280, entitled "Method and Apparatus for Targeted Advertising," both of which are hereby incorporated by reference. Confirmation of the programming delivery is also sent to the database administrator 502 for logging into the aggregator local database 501.

Similarly, if content is copyright protected and the user is granted certain rights and denied others for use of copyright protected content, the content delivery processor 453 can command a digital rights management processor 454 to implement a digital rights management (DRM) scheme. The DRM scheme controls how digital content is used, including, but not limited to, whether or not the content can be stored on the user terminal 202, copied to another system, forwarded to another user, transferred to removable media, or translated into a different digital content format or coding scheme. The DRM scheme may be able to make use of digital encryption technology to enforce copyright protection if necessary. When this is the case, the digital rights management processor 454 will command the content delivery processor 453 to route the subject programming content along with encryption data to an encryption processor 455. The encryption processor 455 encrypts the programming content and returns the content to the content delivery processor 453 for transmission to the end user. Under this type of scenario, the authorized user terminal 202 will possess the necessary information to decrypt and output the programming content. The user terminal 202 will also contain the necessary information to enforce any DRM scheme that has been applied to a particular piece of content.

During the delivery of programming content other than broadcast programming over the concatenated cable television system 216, the user terminal 202 continuously responds to the content delivery processor 453 identifying the user terminal 202, verifying that the appropriate data is being delivered, and indicating that the delivery should continue. If the download is terminated by the user, the user terminal 202 informs the content delivery processor 453, which then terminates the delivery.

Figure 10:
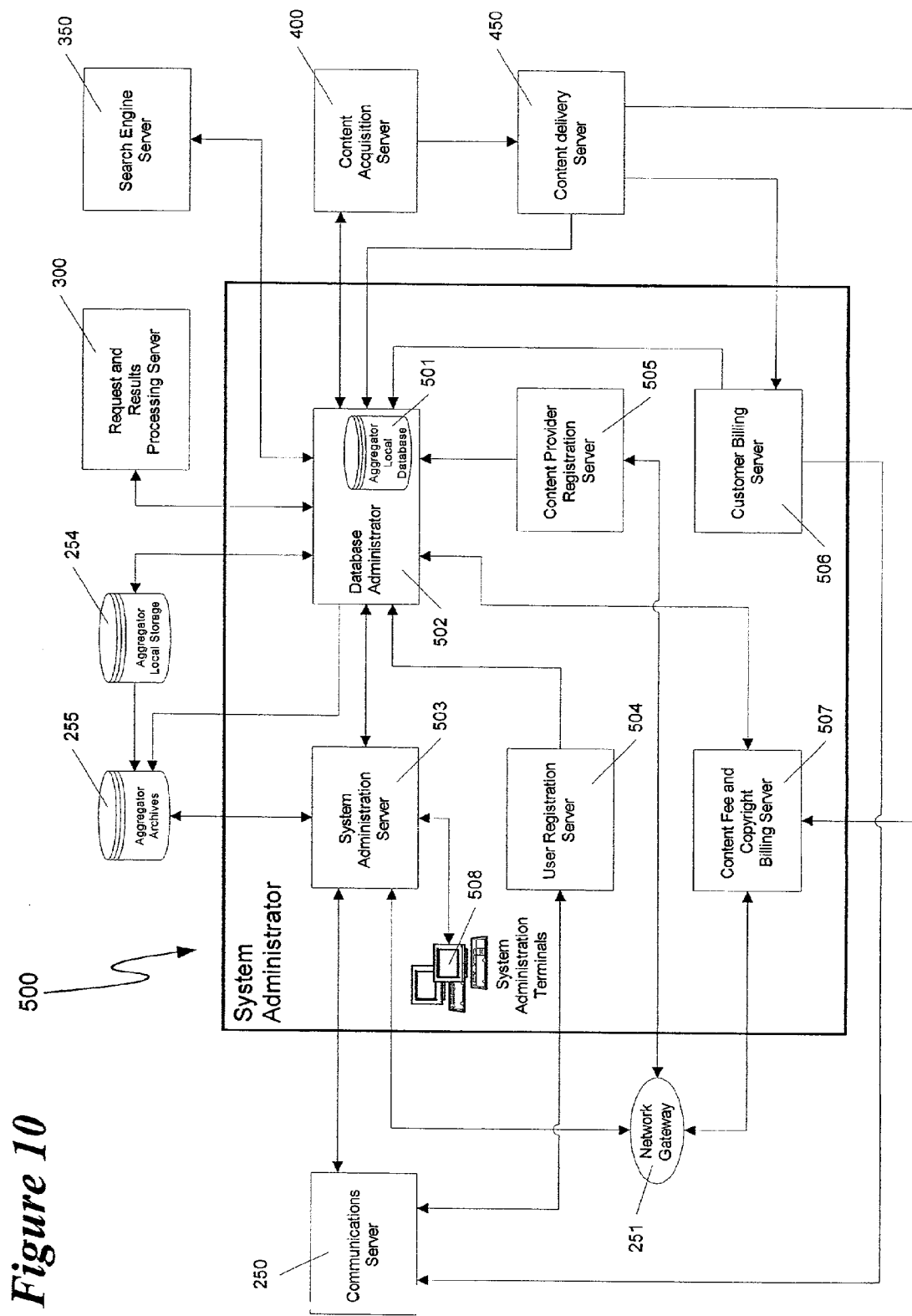
FIG. 10 is a schematic of subsystems of a system administrator and components with which the system administrator interacts as part of the content search, packaging, and delivery system.

Upon successful delivery of the requested programming, the content delivery server 450 logs the results with a customer billing server 506 and content fee and copyright billing server 507 within the system administrator 500 (see FIG. 10). The customer billing server 506 determines if the content delivery requires additional charges to the customer's account and enters this into the billing record and logs it with a database administrator 502.

In addition to tracking billing for system end-users, the content search, packaging, and delivery system 200 also manages payments of royalties and fees to providers of certain content. This is done by the content fee and copyright billing server 507. The fee structure for payment for content to program providers is put into place between the system 200 and the programming content providers by a content provider registration server 505.

The system administrator 500 oversees the operations of the content search, packaging, and delivery system 200. A system administration server 503 serves as the top-level management function for the system 200. The system administration server 503 manages communications between the various subsystems of the aggregator 201 through a local area network and manages a list of authorized administration users to manage the system 200 through a set of system administration terminals 508. A user registration server 504 manages the signup procedure for new users and the termination of user accounts. The user registration server 504 interfaces with the communications server 250 to present the user with appropriate screen menus and prompts to gather user information and billing data to setup an account. A variety of information is requested of the user including, but not limited to, name, address, age, gender, television viewing habits, members of household, and equipment owned. Some of the information that is not required for billing, such as gender and other members of household, can be omitted by the user as part of the system's policy of privacy protection. Once billing information has been verified, the user registration server 504 downloads the required software and database information for the new user terminal 202 in order to allow access to the content search, packaging, and delivery system 200. During this process, the user registration server 504 exchanges information with the database administrator 502 to create the new user profile and billing account in an aggregator local database 501.

Figure 11:
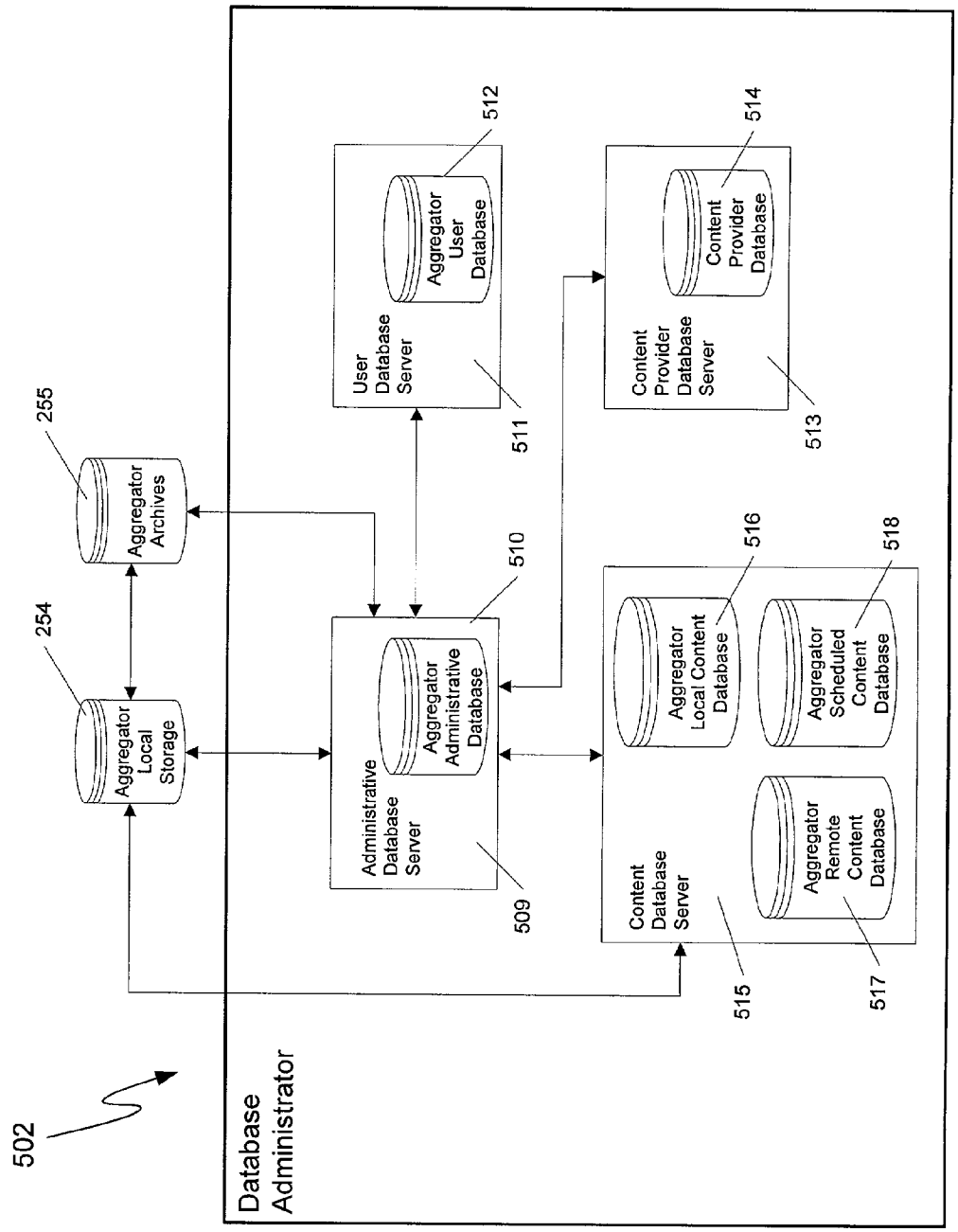
FIG. 11 is a schematic of subsystems of a database administrator as part of the content search, packaging, and delivery system.

A database administrator 502, shown in detail in FIG. 11, maintains the aggregator local database 501 and interfaces with the various components of the aggregator 201 that retrieve information from and store information to the aggregator local database 501. The database administrator 502 controls several database servers. A group of individual databases maintained within the database administrator 502 constitutes the aggregator local database 501. An administrative database server 509 maintains an aggregator administrative database 510, which stores and processes information including, but not limited to, authorized system administrators, passwords, and administrator usage rights. The administrative database server 509 also governs replication of all databases to aggregator local storage 254 and backup of aggregator local storage 254 to the aggregator archives 255. A user database server 511 maintains an aggregator user database 512, which stores and processes information including, but not limited to, user account data, user profile information, user subscription services, user access rights, and past user search and download data (if authorized by the user).

A content provider database server 513 maintains a content provider database 514, which stores and processes information including, but not limited to, a roster of registered content providers and their administrative data, remote provider administrators and their passwords and access rights, and terms of agreements between providers and the operator of the particular aggregator 201. A content database server 515 maintains an aggregator local content database 516, an aggregator remote content database 517, and an aggregator scheduled content database 518. The aggregator local content database 516 stores and processes information including, but not limited to, the catalog of all content stored in the aggregator local storage 254 and all metadata associated with that content. The aggregator remote content database 517 stores and processes information including, but not limited to, the catalog of all content stored in each remote database 261 and all metadata associated with that content. The aggregator scheduled content database 518 stores and processes information including, but not limited to, scheduled broadcast programming content and scheduled streaming program content available to users, available live programming, recurring scheduled programming, and program schedule metadata information.

The system user can initiate content search requests by entering several different types of search criteria using several different options of input device or method. Search criteria can be entered via keywords that relate to certain aspects of programming content including, but not limited to, subject, author, title, cast members or performers, director, and/or content description. A search can be based on program type or format including, but not limited to, movies, television series, documentaries, sports programs, talk radio, and music radio. The user may input search criteria based on subject categories including, but not limited to, action, drama, history, educational, juvenile, adult, current events, nature, live events, and music categories such as classical, jazz, rock, consumer affairs, political content, and geographically specific content. Search criteria can also be entered based on time of day, channel, and/or content provider. The user may also input free form questions using plain speech patterns. In any case, the different search criteria can be used separately or in conjunction with one another to refine a content search. An example might be the entry of "Titanic" as a keyword, "Documentary" for program type, and the free form question "What company built Titanic?".

Figure 12:
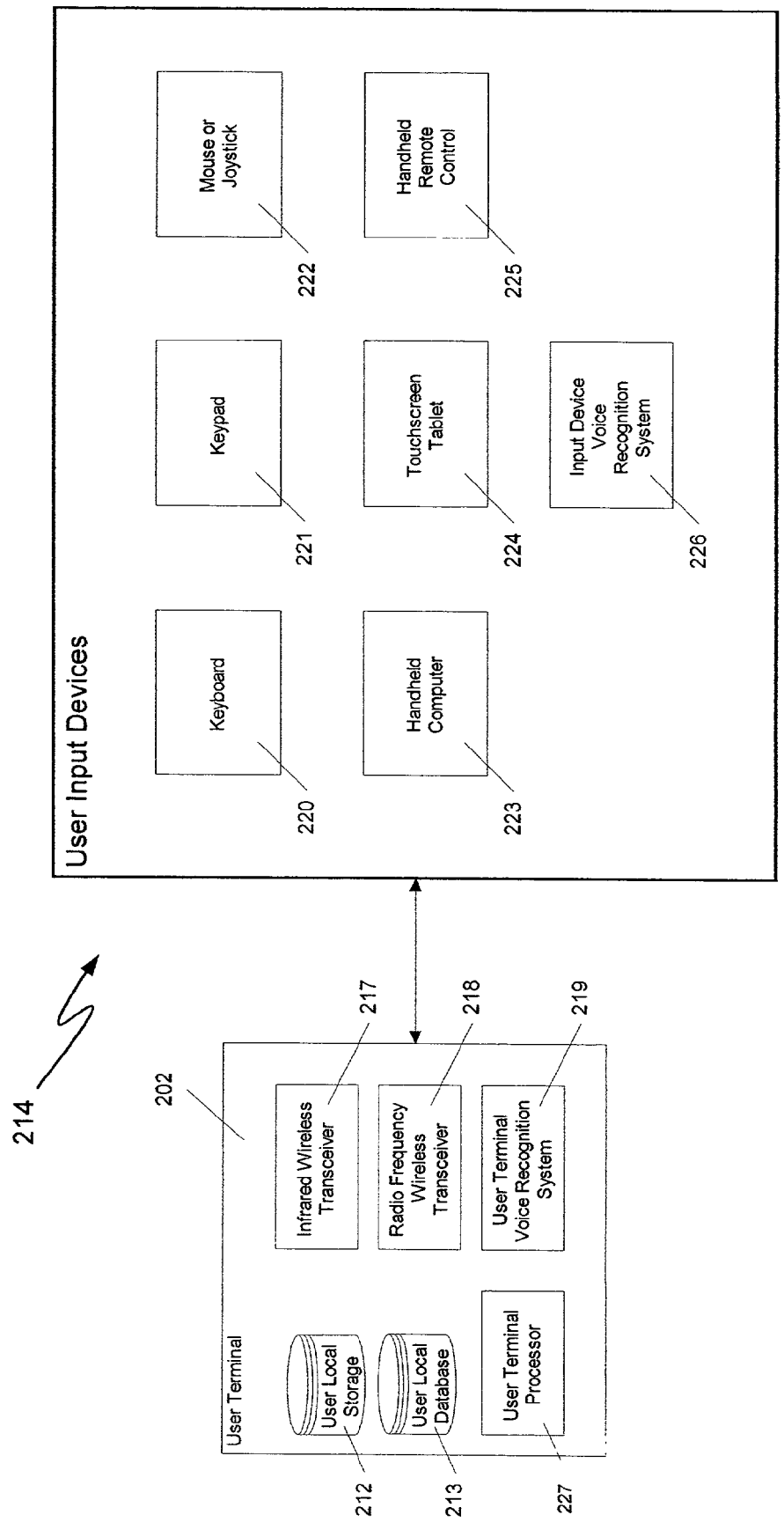
FIG. 12 is a schematic of various user input devices that may be used with the user terminal of the content search, packaging, and delivery system.

The user can interact with the user terminal 202 to input search parameters using one or more of several user input devices 214 including, but not limited to, those shown in FIG. 12. The user input device 214 includes a keyboard 220, a keypad 221, a mouse or joystick 222, a handheld computer 223, a touch screen tablet 224, a handheld remote control 225, a user terminal voice recognition system 219, an input device voice recognition system 226, and an electronic book reader 230.

In an embodiment, keywords and free form question criteria can be entered with the keyboard 220 attached to the set top terminal 206 or the personal computer terminal 211 and content type and category criteria can be selected using the mouse or joystick 222, which controls a cursor on the screen. In another embodiment, text for keywords and free form questions can be entered using the keypad 221, which can be located on the set top terminal 206, in the handheld remote control 225, or in a dedicated wireless unit (not shown). The handheld remote control 225 may also incorporate a pointing control device or button to move a cursor on the screen and activate selections under said cursor and to navigate through a series of graphical user menus. In another embodiment, the handheld computer 223, electronic book reader 230, or the touchscreen tablet 224 can contain software programming enabling an input device to the user terminal 202 using an infrared or wireless link and allowing text input and on screen cursor and menu control. The handheld computer 223 refers to devices including, but not limited to, personal digital assistants, palm top computers, and multifunction devices such as wireless telephones and mobile Internet access devices capable of operating third party software. In yet another embodiment, voice recognition technology can be used to input text and to control onscreen navigation and selection functions. Voice recognition can be implemented by receiving and processing speech at the user terminal 202 through the user terminal voice recognition system 219. In another embodiment, voice recognition can be implemented by receiving speech by a remote input device using the input device voice recognition system 226. The input device would then convert the received speech to text and onscreen control commands and send those to the user terminal 202 using the infrared or wireless link.

In order for the user terminal 202 to communicate with the various remote input devices, the user terminal 202 may be equipped with an infrared wireless transceiver 217 and/or a radio frequency wireless transceiver 218. These systems will support various popular industry standards in use for device communication via infrared and radio frequency wireless links.

The user can also input search criteria by making selections from a graphical user interface (GUI). In an embodiment, the user terminal 202 generates a content search GUI containing menus that allow the user to select and enter various search criteria. The user can select a criterion to be searched by delineating areas of a GUI. For example, the user can select a criterion to be searched by putting a check in a box associated with the criterion or by placing the cursor over a hyperlinked criterion description and hitting an activation button that then causes a submenu GUI to be displayed that shows selections to be made within that search criterion. (See Ser. No. 07/991,074, filed Dec. 9, 1992, entitled "Television Program Packaging and Delivery System with Menu Driven Subscriber Access", hereby incorporated by reference, for additional detail on using cursor keys.) For example, the user might select from programs based on general themes including, but not limited to, categories of programs, actors and actresses, musical performers, day and time, and channel or content provider. If the viewer then selects categories of programs, a submenu containing different categories of programs such as sports, drama, comedy and romance will appear. If the user then selects sports, another lower level submenu will appear listing different sports. Each of the menus will include a choice to enter keywords or free form text in addition to the menu-selected search criteria. Once the user has sufficiently narrowed the search criteria, the search can be executed by selecting an option to submit the search. For privacy protection, during this process, an option on the GUI menus allows the user to prevent the set of search criteria from being included in a local user profile as well as the user profile resident at the aggregator 201. If the user opts not to include a particular set of search criteria into the user profile, the search request will be tagged accordingly as it is processed through the system and when results are returned to the user, those results will also be omitted from the user profile, both locally and at the aggregator 201.

Figure 13A:
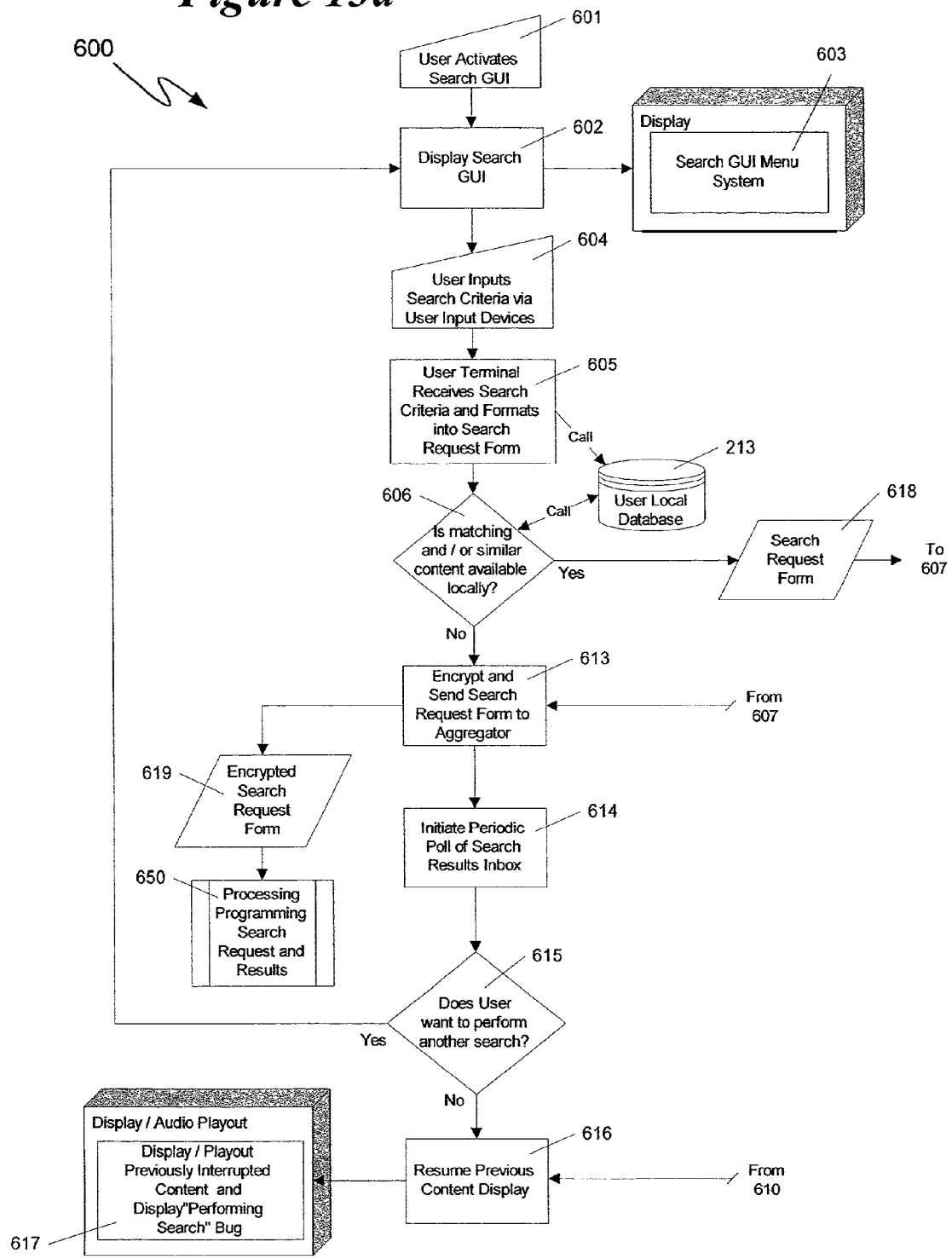
FIGS. 13A and 13B show a flowchart describing a process of initiating a content search request using the user terminal that communicates with the aggregator.
Figure 13B:
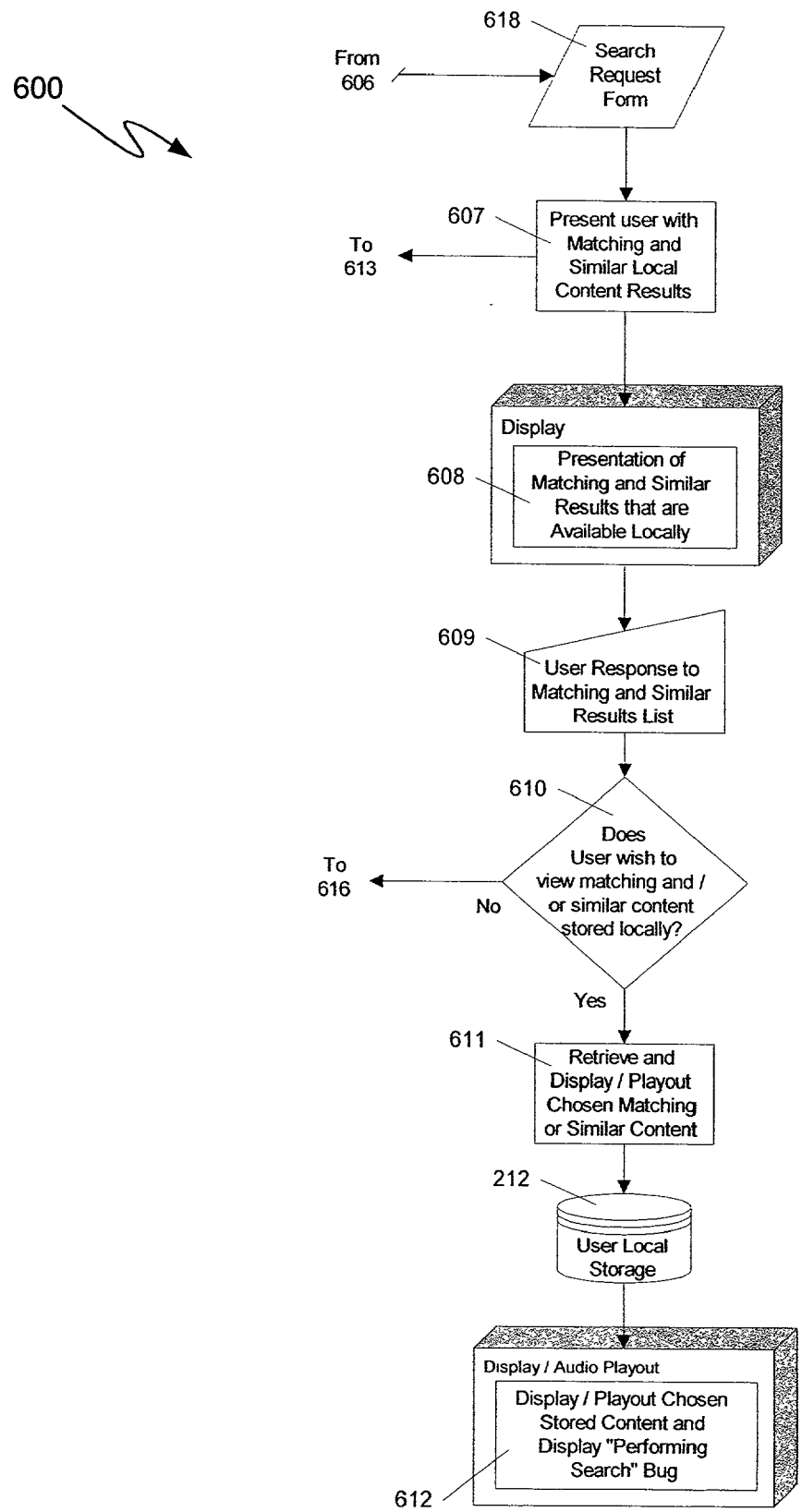

A process 600 for initiating a programming search request 600 is shown in FIGS. 13A and 13B. The process 600 starts when the user activates the search menu (routine 601) using one of the input devices 214 described above. In display routine 602, the user terminal 202 displays the top-level graphical user interface (GUI) search menu 603. In input routine 604, the user employs the user input devices 214 to navigate through the GUI search menu system and input various search criteria. During the search criteria input process, the user is also presented with the option to omit a particular search from being logged into the user's profile and the option to disable the return of suggested content based on the current search and prior searches recorded in the user's profile. When the user submits the search request, format routine 605 begins processing the search criteria in order to format the search criteria into a search request form 618.

The search request form 618 shown generally in FIGS. 13A and 13B and in more detail in FIGS. 18A-18C is an electronic form standardized within the content search, packaging, and delivery system 200. The search request form 618 is populated with required user information and search criteria in order for the aggregator 201 to perform the search for relevant content. The search request form 618 contains data fields including, but not limited to: user identification, user authorization, password, digital rights management (DRM) information, user's encryption key if applicable, content format requirements, updates to the user's profile (if enabled by user), user network routing information, and the programming search criteria. The search criteria section of the search request form 618 will contain several hierarchical lists of criteria to accommodate the various types of search criteria that can be entered by the user. Search criteria entries include, but are not limited to, program type, content format, topic or subject, content description, date and time range, channel or content provider, and a list of keywords received from user input, and results derived from free form questions.

If criteria are input as a free form question, routine 605 applies a search criteria algorithm to parse the question and transform the question into relevant search request form 618 contents. The sentence structure is analyzed and, based on order and relative positions of the words within natural language sentence structure, significant terms are categorized and entered into appropriate fields of the search request form 618. In an embodiment, the search request processor 303 (see FIG. 5) will access a lexicon of all known English language words, terms, and names in order to augment the search request form 618 with various forms of words found in free form questions. For example, if the question is "Who assassinated Abraham Lincoln?" the search request processor 303 will access the lexicon and return other forms of the word "assassinated" such as "assassinate", "assassin", and "assassination". In another embodiment, other similar words will be added to the search criteria such as "kill" and "murder". The search request processing algorithm can also designate additional search parameters based on the type of query words used in the free form entry. For example, a question such as "Where does the largest land mammal live?" will cause the search process to prioritize results containing geographical information within the content metadata and description.

Once the search request form 618 has been formatted, routine 605 logs the search criteria into the user local database 213 associated with that particular user (if the search has not been selected for omission from the database). The search criteria may be kept as a part of the user's profile for suggesting content and for personalizing searches and advertising. The routine 605 then forwards the search request form 618 and matching routine 606 uses the search criteria within the search request form 618 to search the user local database 213 for matching or similar content that is stored in the user local storage 212. If no matching or similar content is found locally, the routine 606 routes the search request form 618 to routine 613. If the search yields matching or similar content that is available locally, the routine 606 routes the search request form 618 to routine 607, which formats the results of the local database search into a local results form, which is then presented on the video display system 207 by display results routine 608. Concurrently, the routine 607 forwards the search request form 618 to the routine 613, which opens communications with the communications server 250 at the aggregator 201, encrypts the search request form 618, and forwards an encrypted search request form 619 to the request and results processing server 300, which initiates processing of the search request represented by processing routine 650 as shown in FIG. 14A.

Once the encrypted search request form 619 has been sent to the aggregator 201, polling routine 614 initiates a periodic poll of the results inbox at the user terminal 202. When results are returned by the aggregator 201 in the form of a search results form 674 (see FIGS. 19A and B for a detailed structure of the search results form 674), the search results form 674 is delivered to the results inbox and a subsequent poll will initiate the display of the results to the user. After the periodic poll is started, the user terminal 202 prompts the user to perform another search (routine 615). If the user responds "yes," the routine 615 routes the process flow back to the display routine 602, which again displays the search GUI menus 603. If the user chooses not to perform another search, processing moves to the routine 616, which resumes playout or display of programming that was in process when the search was first initiated. Execution of routine 617 results in a display of a small icon or window in a small portion of the video display indicating that the search is in progress. This icon is referred to as the "Performing Search" bug. If the local search found content and displayed the local search results to the user, the user inputs a selection using routine 609. If the user chooses not to view any of the local results, routine 610 routes processing to the routine 616. If the user chooses to playback programming from the local results, the chosen selection is retrieved by retrieval routine 611 from user local storage 212 and played back by playout routine 612 through the video display system 207 and/or the audio playout system 208. The routine 612 also displays the Performing Search bug on the display screen. The Performing Search bug may have an option to hide the icon, therefore removing the icon from the display.

Figure 14A:
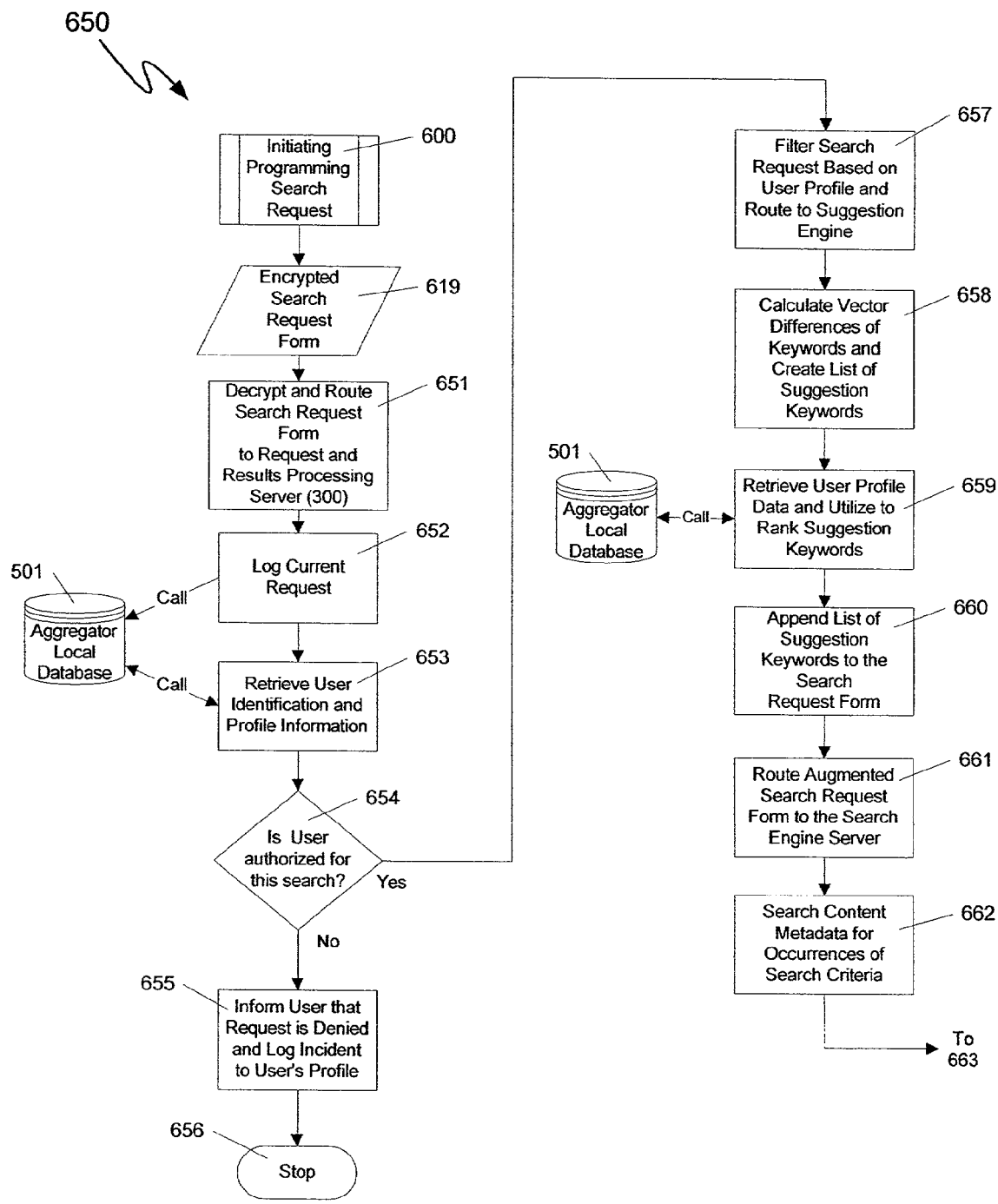
FIGS. 14A and 14B show a flowchart describing processing of content search requests and search results performed within the aggregator.
Figure 14B:
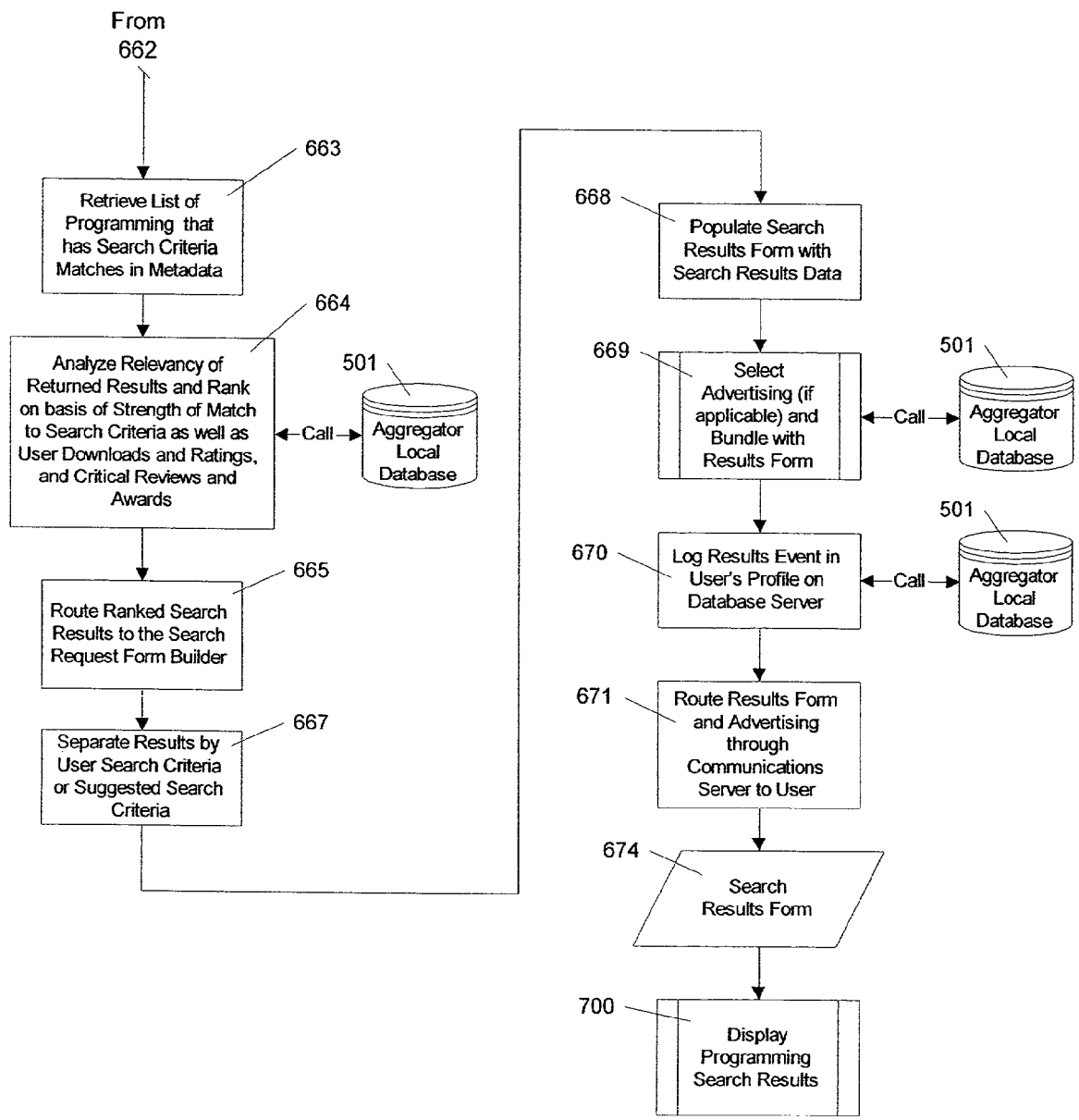

FIGS. 14A and 14B show a flowchart for processing programming search requests and results 650. In a first stage, the encrypted search request form 619 is received from the programming search request initiation process 600, decrypted, and routed to the request and results processing server 300 (routine 651). Log routine 652 performs a call to the aggregator local database 501 to log the current request into the user's profile. If the user has indicated that the current search shall not be included into the user's profile, only administrative data pertaining to the search are recorded. Recorded information includes, but is not limited to, updates to the user profile (if enabled), changes to the user terminal 202 architecture, additional user identities, deleted user identities, and increments to the search counter for tracking and billing. Routine 653 also performs a call on the database to retrieve user identification and profile information. Routine 654 uses the user data in the search request form 618 and the information retrieved from the aggregator local database 501 to verify that the user is authorized to perform the particular search. A search can be designated as unauthorized under certain conditions including, but not limited to, if the user searches for specifically tiered channels that the user's account cannot access such as premium pay movies, if adult material or channels are designated in the search and the user is identified as being restricted from such access, or if the user's billing status is not in good standing but the account has not yet been terminated. If the search is deemed unauthorized, routine 655 notifies the user terminal 202 that the search request has been denied. The user terminal 202 displays the search request denial message along with any other relevant data such as the reason for denial. The process 650 then stops (routine 656).

If the user is authorized for the particular search, the search request form 618 is forwarded. In an embodiment, filter routine 657 filters the request based on the user's profile. In another embodiment, this filtering occurs within the user terminal 202 prior to the search request form 618 being sent to the aggregator 201. The filtering process narrows the range of sources that will be searched by eliminating types of content or content providers based on the user's preferences. For example, the user may designate that no children's programming or sources be returned in the search results. In this case, the routine 657 appends the search request form 618 to indicate that such programming and sources should not be included in the programming search. This not only allows the user to more finely tailor the search, but also allows the aggregator 201 to perform quicker and more efficient searches by reducing the range of sources and records that will be searched.

The routine 657 then routes the search request form 618 to the content search suggestion engine 304 (see FIG. 6), which uses the information in the search criteria and user profile to create a list of suggested search criteria. In an embodiment, the content search suggestion engine 304, maintains an indexed database of suggestion keywords in the suggestion database 308. The relevance of a given search keyword, which is obtained from the user's search request form 618, to a suggestion keyword is determined in vector difference routine 658 by calculating a vector quantity difference between the search keyword and indexed suggestion keywords. The vector quantity may be a measure of similarity between two words that is calculated by determining relative values of several categorical descriptions of each word including word type, part of speech of each word, and relative locations or linkage in a thesaurus. Suggestion keywords that fall within a predetermined range of relevance, i.e., that have vector quantities below a certain limit, are collected in execution of the routine 658 by the suggestion database processor 307. The routine 659 then weights, or ranks, the list of suggestion keywords based on information retrieved from the user's profile concerning earlier search and download requests. The suggestion database processor 307 then adds these suggested search criteria to the search request form 618 in routine 660, creating an augmented search request form, which is forwarded to the search engine server 350 by (routine 661).

To create and maintain the indexed suggestion database 308, the content metadata crawler 309 periodically crawls the content metadata entries of all listed content and programming in the aggregator local database 501 and retrieves all descriptive data for each entry. Crawling is a thorough scan and retrieval of all data pertaining to each content item that is listed in the content database server 515, which includes information about all registered content and information about programming that has been retrieved by crawling sources of content. The suggestion keyword indexer 310 then associates a unique numerical value to each term and enters this into the suggestion database 308 as indexed suggestion keywords. The index indicates the proximity of terms to one another within the metadata. This proximity within the metadata is then used by the suggestion database processor 307 to determine the vector relevance of suggestion keywords to search keywords and select a range of suggestion keywords to add to the search request form 618. See The Anatomy of a Large-Scale Hypertextual Web Search Engine, Sergey Brin and Lawrence Page; Computer Science Department, Stanford University, Stanford, Calif. 94305, U.S.A., hereby incorporated by reference, for more detail about crawling of websites, indexing terms, and ranking of search results.

Using the example of Johnny Weismuller, the content metadata crawler 309 crawls the database and returns numerous descriptions of Tarzan movies and other content and collects data including, but not limited to, co-stars, directors, settings, authors, and plot lines or subjects. The suggestion keyword indexer 310 indexes Johnny Weismuller and all other information found and assigns a vector relevance based on type of information and proximity. Then other significant terms, such as Africa as the story setting, are then crawled and the process is repeated to populate the suggestion engine database. When a user searches for Johnny Weismuller, the suggestion database processor 307 returns an augmented search request form that contains suggested search criteria that will return related results such as other movies produced during that time period set in Africa, other movies based on stories by Edgar Rice Burroughs, novels by Edgar Rice Burroughs, and other movies with similar plot lines such as a child being isolated in the wilderness left to fend for itself while growing up. Search results returned based on suggested search criteria are labeled as such as they are processed by the search engine server 350.

In an embodiment, the search request processor 303 maintains a lexicon of all known English language words, terms, and names and will augment the search request form 618 with variations of words listed as keywords. For example, if the search request form 618 contains "sink" and "Titanic," other forms of the word "sink" will be added to the search criteria such as "sunk" and "sinking" while ignoring the alternate definition of "water basin." In yet another embodiment, the search request processor 303 also maintains lexicons for chosen non-English languages and will have the capability to perform language translation of search criteria for augmentation of the search request form 618.

The search engine server 350, as shown in FIG. 7, contains the subsystems necessary to perform searches of all available content, process the search results, and crawl remote content sources. A search is initiated when the request and results processing server 300 forwards an augmented search request form to the search engine processor 351 represented by routine 661 in FIG. 14A. In routine 662, the search engine processor 351 uses the criteria within the augmented search request form to perform a search for matching data within the replicated content database 357. The replicated content database 357 is a copy of the contents of the content database server 515 within the system administrator 500. The replicated content database 357 is periodically updated by the system administrator 500 and is maintained within the search engine processor 351 to allow quicker and more efficient return of search results. The search engine processor 351 uses retrieval routine 663 to retrieve a programming list for which any of the search criteria appeared in the content metadata. The programming list is forwarded to the search results processor 355, which, in routine 664, compares the relevancy of each returned result to the search criteria and ranks the results based on strength of the match using information including, but not limited to, key words, subject, content type, content category, author, and cast members. Relevancy and strength of match are determined by the number and type of matching criteria as well as the user's profile data such as preferred content providers and past download requests. If the user is searching for movies about Titanic, then movies with "Titanic" in the description will be ranked higher than documentaries about Titanic. In an embodiment, the search results processor 355 will also take into account such information as how many other users have downloaded the program and whether the program has received positive critical reviews and will improve the ranking of more popular and well reviewed programs. Therefore, for a search of content type "movie" and keyword "Titanic" the search engine server 350 would return the 1997 Academy Award winning movie Titanic as the top ranked content match. The second ranked result would likely be the audio soundtrack from the same film.

The search engine server 350 also crawls remote content sources in order to maintain an up-to-date listing of content available from independent providers that are not registered with the content search, packaging, and delivery system 200. The crawling is done by periodically searching sources of content using the wide area network/Internet 205 and returning available metadata about content that is not already listed in the aggregator local database 501 and adding these listings to the database 501. Subsequent replication of the content database to the search engine server 350 will include these updated listings.

Another function performed by the search engine processor 351 is maintaining a list of active searches. If a user's search request did not yield satisfactory results, or if the user wishes to receive future results based on a particular set of search criteria, the user can request that a particular search request remain active for a certain period or indefinitely. When this option is exercised, the user terminal 202 sends a message to the request and results processing server 300, which instructs the search engine processor 351 to keep the search active. When there are changes to the replicated content database 357, a delta report that describes content entries that have been changed and/or added to the database is sent to the search engine processor 351. The search engine processor 351 compares the data in the delta report to all active searches and generates a results list for any active search that matches new or changed content entries. The results are then forwarded to the request and results processing server 300 for routing to the respective system user.

Once the search engine processor 351 has ranked the search results, these results are sent to the search results form builder 305 (routine 665 in FIG. 14B). Routine 667 separates the results based on whether the results are in response to user defined search criteria or suggested criteria. Routine 668 reads the metadata of each result listing and enters the metadata into the data fields of a structured search results form 674. The search results form 674 shown in FIG. 19 contains data fields including, but not limited to, program title, scheduled time of availability, content provider or channel, program type, category, running time, production date, critical reviews or links to reviews, data concerning frequency and number of downloads by other users, target audience or content rating, and the general description including program description, plot line, and cast. The system 200 then accesses the user's profile and determines if based on user information, account type, and search type whether advertising is to be incorporated into the display of the search results. If so, select advertising routine 669 (see FIG. 14B) determines what targeted and general advertising is to be sent and retrieves from the aggregator local database 501 the advertisements that have not previously been sent to the user and stored in the user terminal 202 for playout. These advertisements are bundled with the search results form 674 and log results routine 670 logs the results form and which advertisements were chosen into the user's profile in the aggregator local database 501. The routine 670 then routes the advertisements and the search results form 674 through the communications server 250 to the user terminal 202, which stores and displays the results (display routine 700).

Figure 15A:
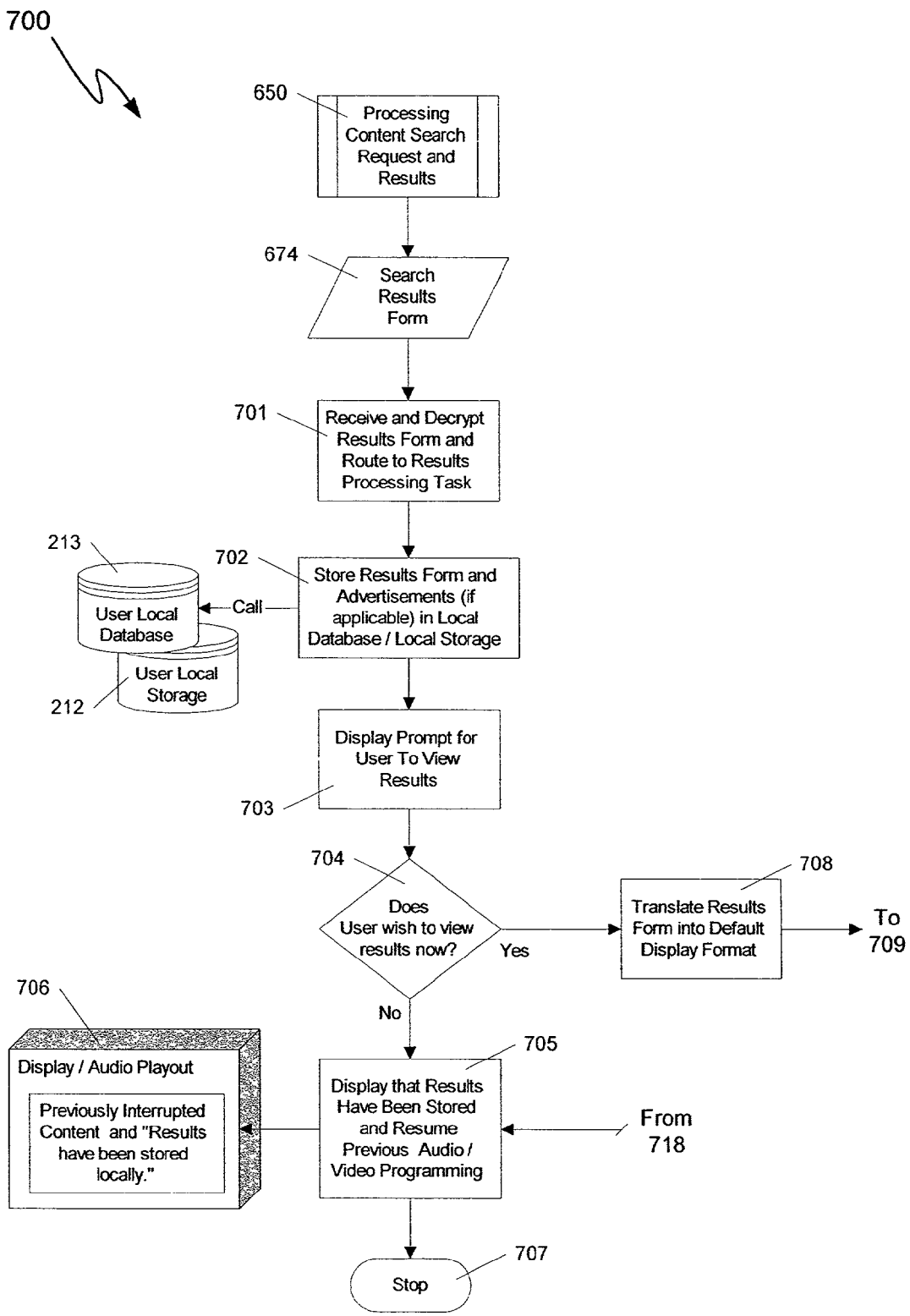
FIGS. 15A and 15B show a flowchart describing a process at the user terminal for displaying programming search results and initiating content download requests.
Figure 15B:
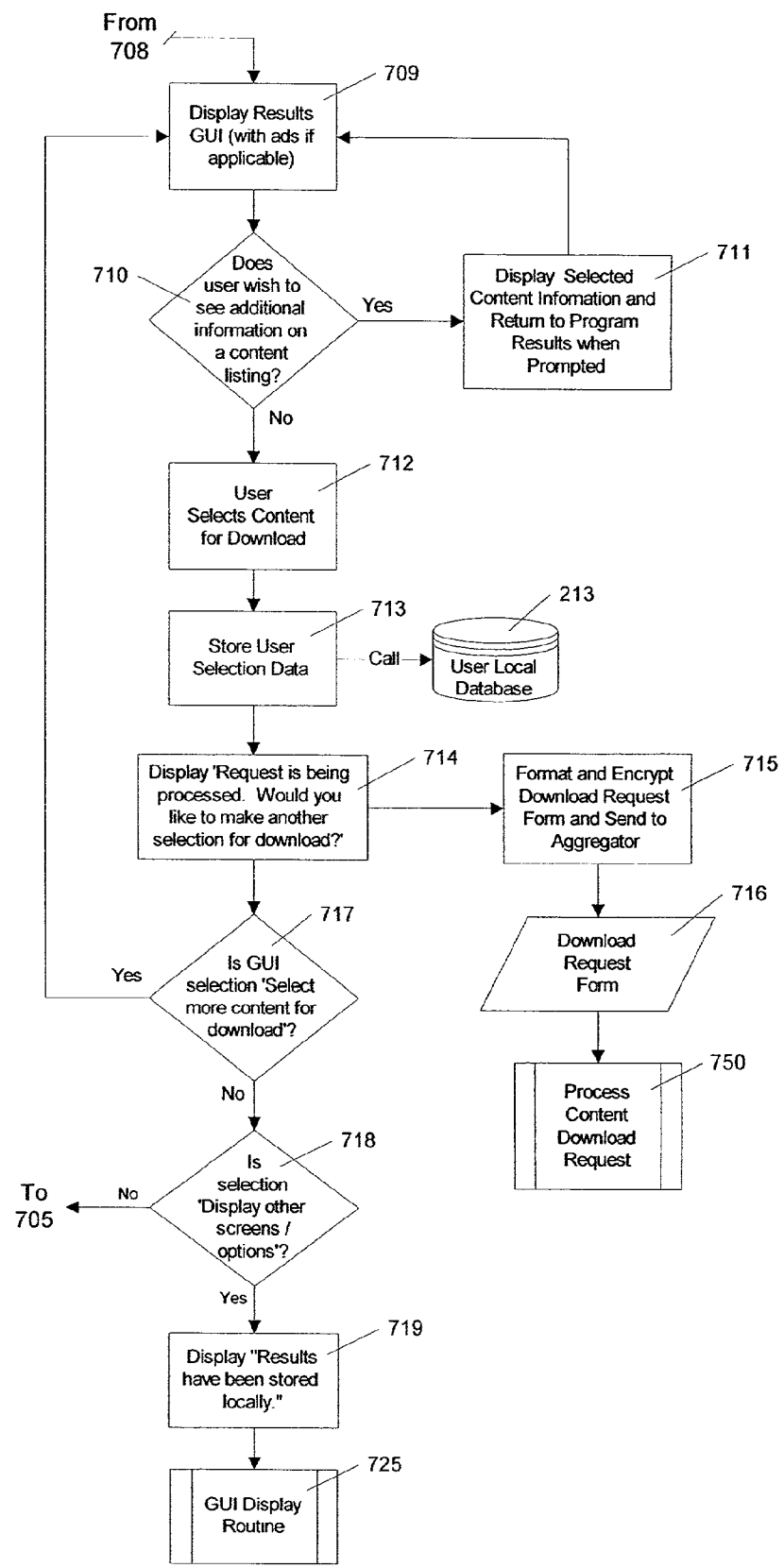

Based on the content search, the user terminal 202 receives the search results form 674 from the communications server 250. FIGS. 15A and 15B show a display programming search results process 700 with the search results form 674 being decrypted and routed to the results processing task internal to the user terminal processor 227, routine 701. The following tasks are all carried out by separate software and/or firmware modules that are subsystems of the user terminal processor 227. In storage routine 702, the processor 227 stores the search results form 674 in the user local database 213 with a logical link to, or association with, the search request form 618 that generated the search results. At the same time, if advertisements are sent to the user terminal 202 by the aggregator 201 for display with the results, the routine 702 saves the files to the user local storage 212. After receipt of the search request form 618, routine 703 displays a prompt and/or activates an audible notification that the results of a particular search have been received. Based on a user response to the prompt, routine 704 determines if the results should be displayed at that time. If the user does not wish to display the results at that time, routine 705 informs the user via the audio/visual playout systems 208/207 that the results have been stored for later display. The content displayed on the playout systems (208/207) is then returned to whatever content was previously being presented, routine 706. The user terminal processor 227 then stops processing of the results, routine 707.

If the user wishes to view the search results when prompted, translation routine 708 translates the search results form 674 into the default display format. The default display format can be customized by the user either by manipulating the display and saving the display as the default user format, or accessing and altering a default display template. At anytime, the user can revert to the system default format, which may list the program results in ranked order and may display program attributes including, but not limited to, title, program availability, program schedule, content provider or channel, content type, description, program rating, and options for download. In an embodiment, the default results display includes two sections displayed on-screen with one section displaying results that match the user's search criteria and the second section displaying suggested results based on criteria generated earlier in the process by the content search suggestion engine 304. In another embodiment, one or more sections of the display screen may be dedicated to static or dynamic advertising. In yet another embodiment, the advertisements may serve as hyperlinks to more information about a product or service, or directly to advertised content.

The search results display may be in the form of a GUI that will incorporate, in different sections of the display, various user options including, but not limited to, download and view a particular program, download program and save to user local storage 212 for later viewing, re-order results based on a particular attribute such as program type or content provider, modify or refine search, quit results display, and view other available GUIs. Routine 710 determines if the user wishes to display additional information about a certain content listing based on user input and display routine 711 displays the full content description and selected metadata for the selected content. When the user is finished reviewing the additional information, display is returned to the last screen to have been displayed (routine 711). Routine 712 executes when the user enters a request into the system 200 to download selected content from the results display. Once the request is entered, storage routine 713 stores the selection information in the user profile section of the user local database 213 and passes control to routine 714. Routine 714 then performs three actions: 1) it displays that the download request is being processed; 2) prompts the user to select another content listing for download; and 3) routes the first download request to format routine 715, which formats the content download request form 716 along with appropriate user information for transmission to the aggregator 201. The program download request form 716 is then encrypted and sent over the wide area distribution system 203 to the communications server 250.

Routine 717 monitors the user input and if the user elects to download more programming, the routine 717 returns control to the display routine 709, which once again displays the search results at the video display system 207. If the user does not wish to download more programming, the routine 717 routes control to routine 718, which determines from the user input if the user wants to view other on-screen GUI options. If the user elects to view other on-screen GUI options, display routine 719 displays a status message that the search results have been saved locally and routine 725 starts the process to display other system GUIs. If the user does not wish to view other GUIs, the routine 718 routes control to the routine 705, which resumes the programming playout that was interrupted for the preceding processes.

Figure 16A:
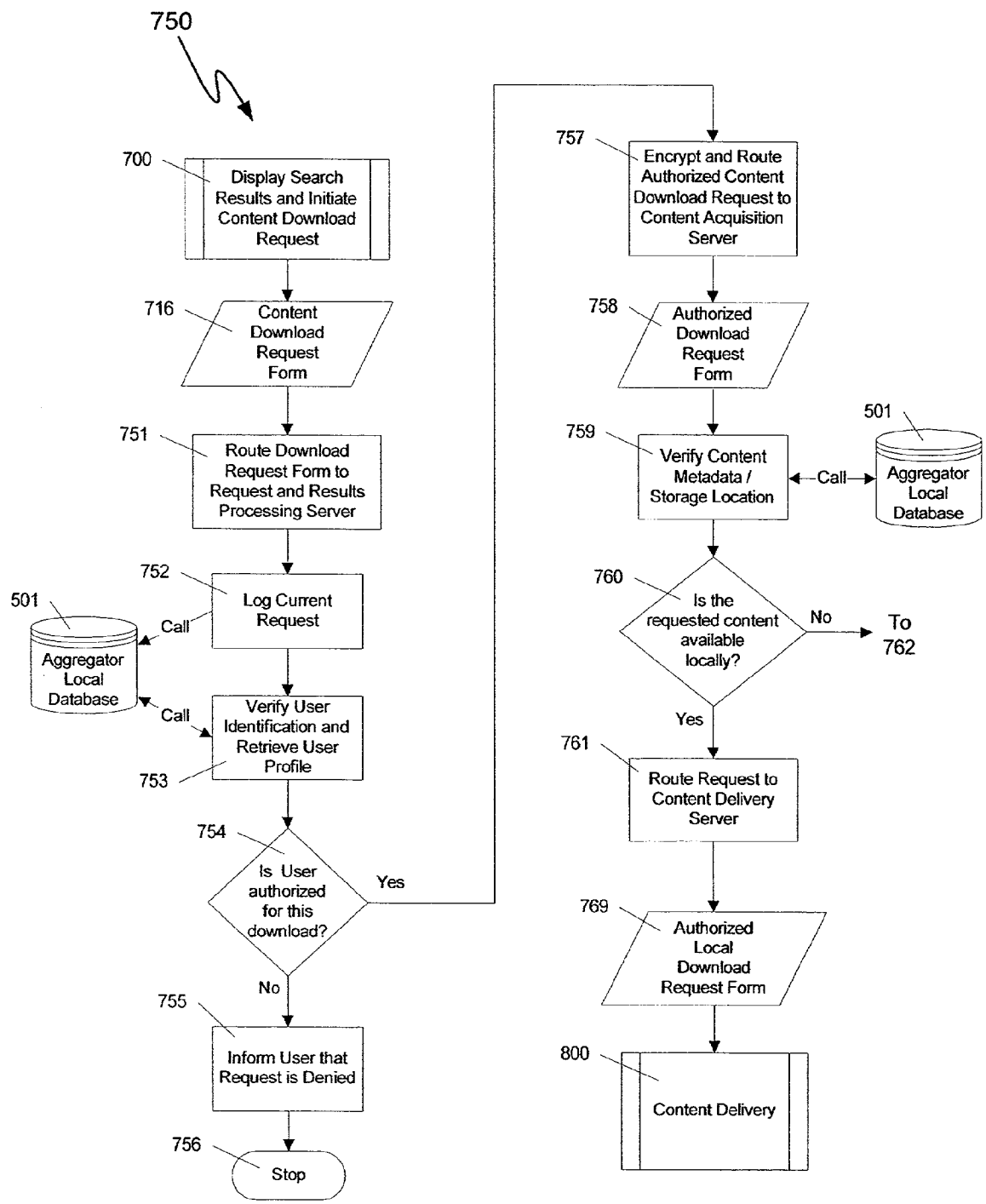
FIGS. 16A and 16B show a flowchart describing processing of programming download requests by the aggregator.
Figure 16B:
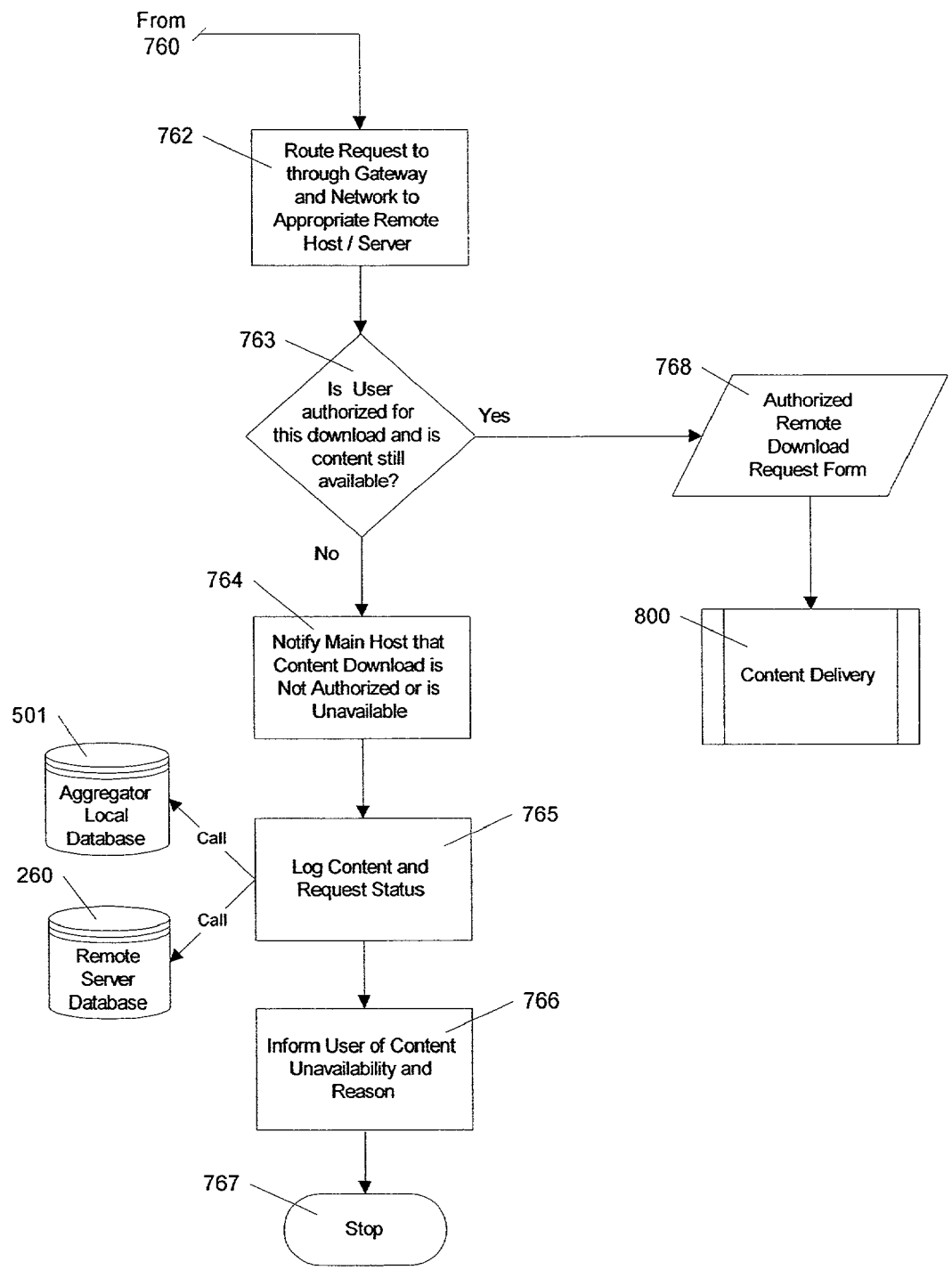

FIGS. 16A and 16B show a flowchart showing the processing content download requests process 750. Once the user terminal 202 has initiated transmission of a download request, the content download request form 716 is received by the communications server 250 and routed to the request and results processing server 300 (routine 751). Within the request and results processing server 300, log routine block 752, the request receiver and router 301 logs the download request with the database administrator 502 in the system administrator 500, entering the data as part of the user's profile. In routine 753, the system administrator 500 retrieves information from the user's profile pertaining to the user's rights to download certain content and execution of routine 754 compares the user data and the content download request in order to verify that the user is authorized to download the requested content. If the user is not authorized to download the requested information, the system administrator 500, in routine 755, sends a message through the request receiver and router 301 to the communications server 250 addressed to the user, informing the user that the request has been denied. The event is then logged with the system administrator 500. Then the process stops, routine 756.

If the content download request is authorized, execution of the routine 757 encrypts and routes an authorized download request form 758 to the content acquisition server 400. Routine 759 then analyzes the metadata associated with the requested content and calls on the aggregator local database 501 to retrieve appropriate data to verify that the content is referenced properly within the request and is still available for download from the indicated storage location or streaming source. Routine 760 then determines if the requested content is to be delivered from a local source or a remote source. If the content is available locally, processing moves to routine 761, which designates the request as an authorized local download request form 769 and routes the request to the content delivery server 450 for fulfillment of the download request, process 800.

If the requested content is only available from a remote source, the routine 760 routes the request to routine 762, which routes the request through the network gateway 251 to the remote content server 204 designated in the aggregator remote content database 517. The remote content server 204 then verifies, using routine 763, that the request is authorized and that the content is still available for delivery. If the content is authorized and available, then routine 763 returns what is now an authorized remote download request form 768 through the network gateway 251 to the content delivery server 450 for fulfillment of the download request, process 800. If the request is not authorized, or if the content is no longer available for download, routine 764 sends notification to that effect through the network gateway 251 to the system administrator 500 in the aggregator 201. In routine 765, the system administrator 500 logs the status of the request and the requested programming in the aggregator local database 501 and the remote content server 204 logs the same information in the remote server database 260. The aggregator 201 then sends a notification, routine 766, to the user informing the user that the request cannot be fulfilled and the reason. The process then terminates with routine 767.

Figure 17A:
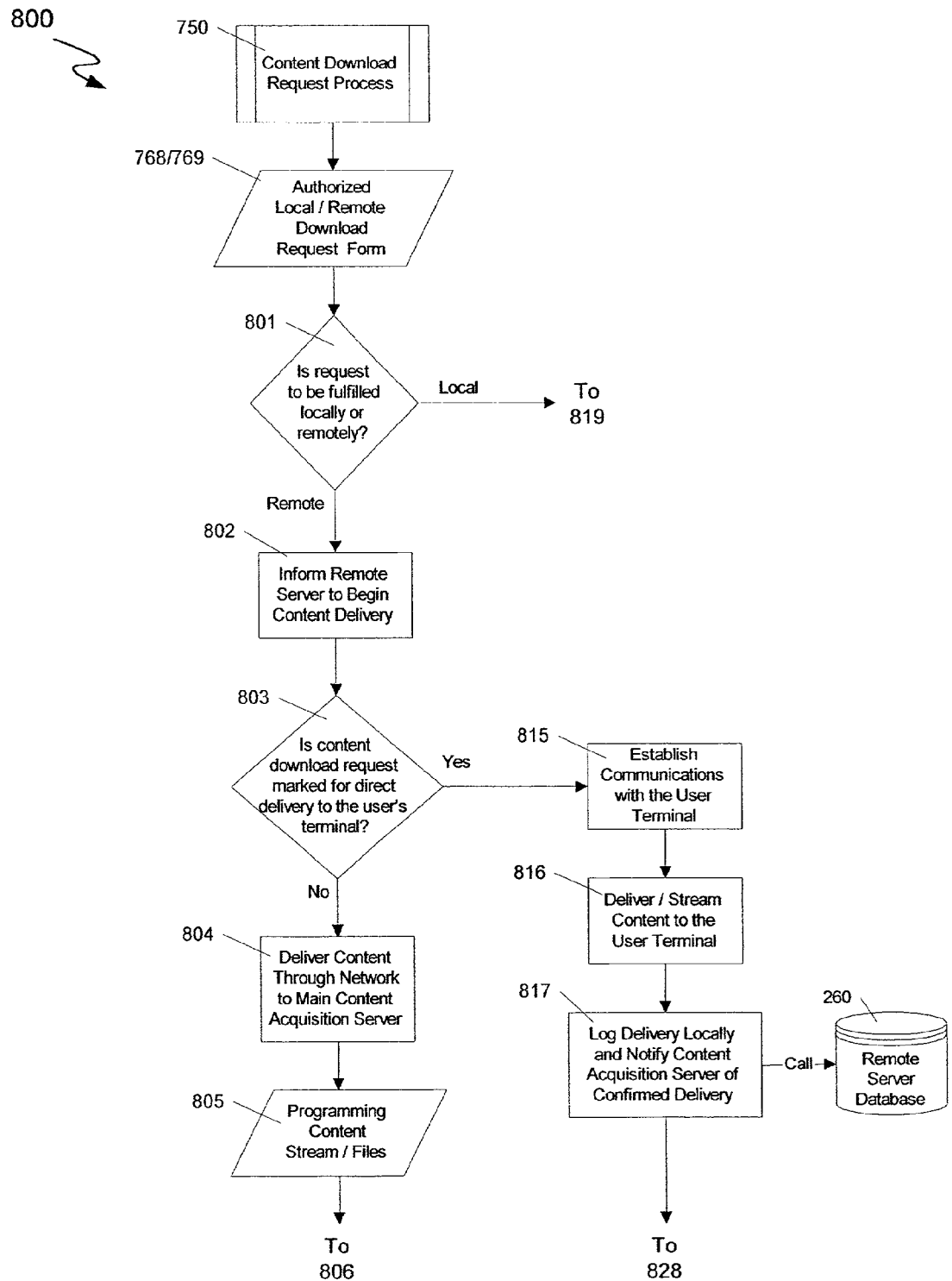
FIGS. 17A-17C show a flowchart describing programming content delivery from the aggregator or a remote content server to the user terminal.
Figure 17B:
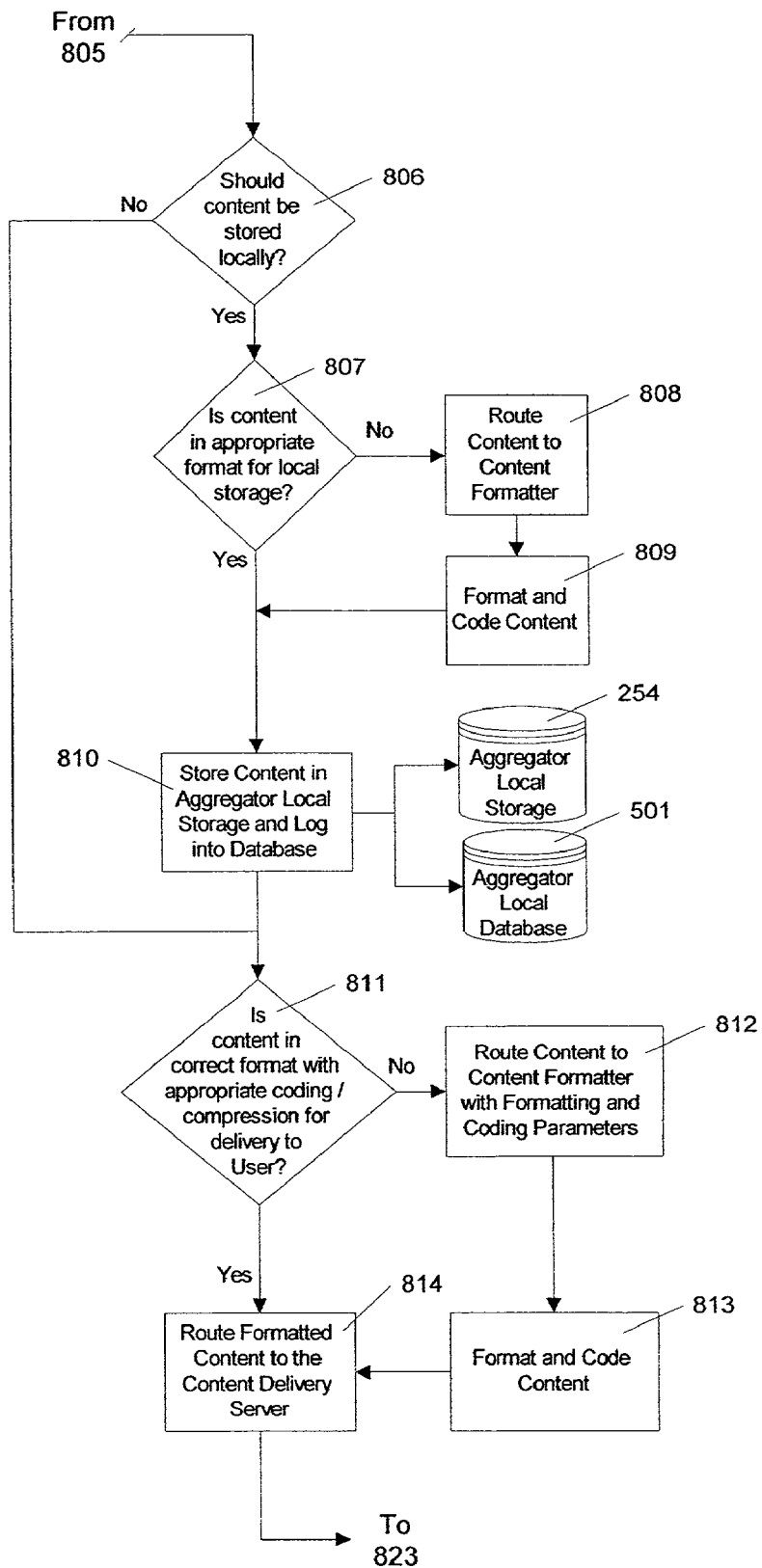
Figure 17C:
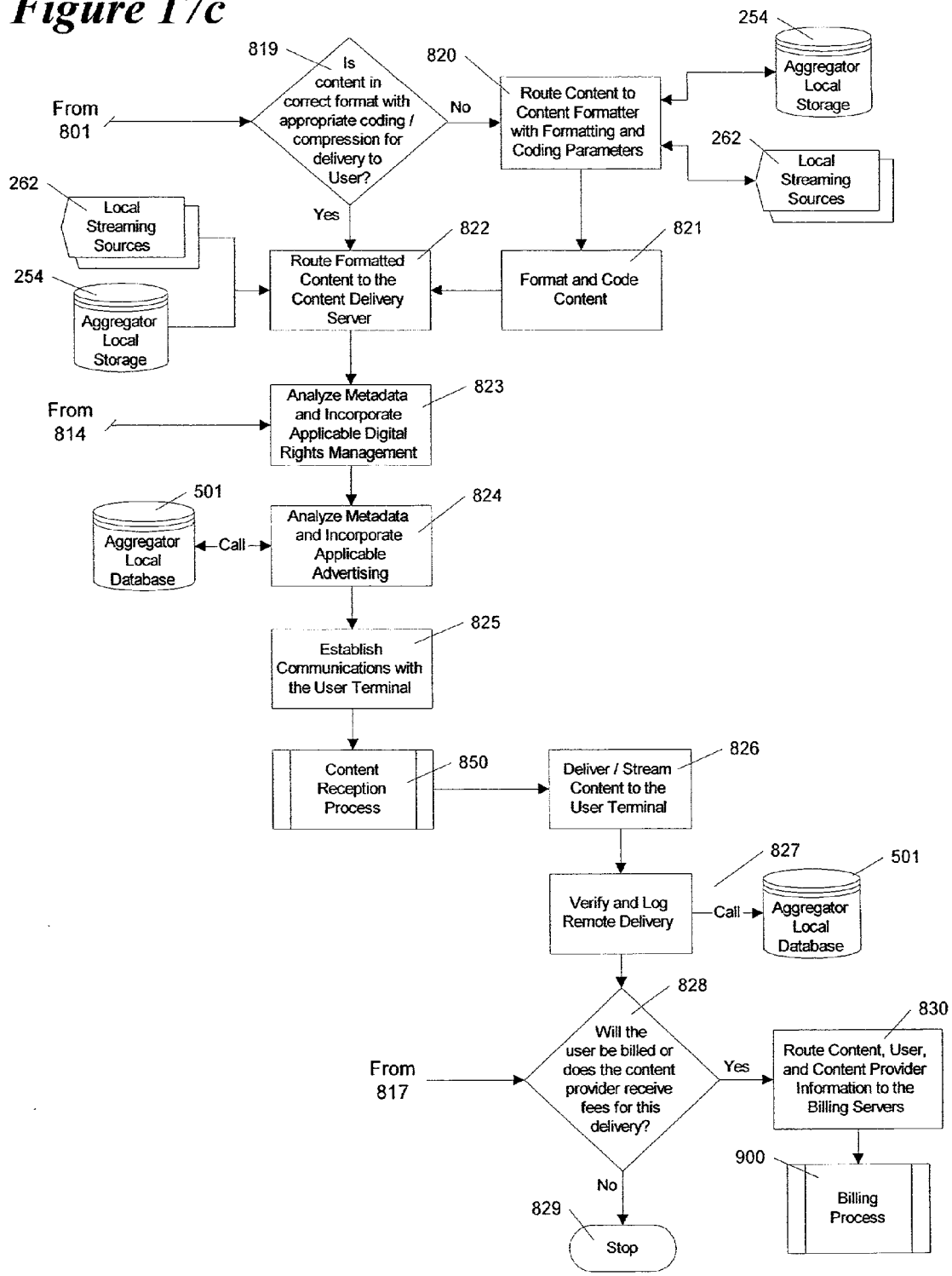

Once a download request has been processed and authorized, the download request is forwarded to the content delivery server 450, which fulfills delivery of the content using the content delivery process 800 shown in FIGS. 17A, 17B and 17C. As an authorized remote download request form 768 or an authorized local download request form 769 is received, the content delivery server 450 determines, routine 801, if the request is local or remote, and routes the request form appropriately (routine 802 for a remote request and routine 819 for a local request).

If the request is to be fulfilled remotely, execution of the routine 802 transmits a message to the remote content server 204 to begin delivery of the programming content. In routine 803, the download request is analyzed and the remote content server 204 determines if the content can be delivered directly to the user without going back through the aggregator 201. If the content is not designated for delivery directly to the user, routine 804 is executed, which establishes a communications link with the content acquisition server 400 through the network gateway 251 and starts transmitting the requested programming. In the case of programming that is airing in real-time, the programming can be in the form of an audio/video stream from various remote streaming sources 259. Non-real-time programming can be in the form of compressed audio/video files delivered from remote content storage 258. When the content delivery process commences, execution of routine 806 initiates a process in the system administrator 500 that analyzes the content metadata and determines if the programming should be stored at the aggregator local storage 254. The system administrator 500 may determine to store a particular program locally based on reasons including, but not limited to, the program being a live event such as a sports event or a musical concert that will likely be requested for download in the future. Alternatively, the programming is not stored locally and the current request represents a predetermined number of users that have requested the content requiring remote delivery.

If the programming being delivered from a remote content server 204 will be stored to the aggregator local storage 254, the programming metadata is analyzed (routine 807) to determine if the content is in an acceptable format for local storage. The aggregator 201 may be configured to store content in one or more specific formats that will balance the highest quality of programming content to be delivered to the users versus available storage space. In an embodiment, one or more of the selected storage formats will make the most efficient use of the aggregator local storage 254 resources as well as support high-speed delivery to system users. If the content is determined to meet the format requirements for local storage, processing passes on to routine 810. If the content does not meet the format requirements, the content stream and/or files are routed to the decoder and content formatter 252, routine 808. At routine 809, the decoder and content formatter 252 decodes the incoming data and may extract digital and/or analog data representing the content and its metadata. The decoder and content formatter 252 then reformats the content into the required formats and coding schemes for local storage. Upon execution of storage routine 810, the properly formatted programming content is stored to the aggregator local storage 254. The process and the new location of the content is then logged into the aggregator local database 501.

Whether or not the content was stored locally, routine 811 analyzes the programming content's metadata and determines if the content is in the appropriate format and coding scheme for delivery to the user. The format and coding scheme for delivery may be different from that used for local storage in order to accommodate particular parameters of a user's download request. The user may request specific formats and coding schemes due to considerations including, but not limited to, the method of playback, the type of programming, whether the user intends to store the content, or the type and bandwidth of the connection the user terminal 202 has to the aggregator 201 or the remote content server 204. If the content is determined to meet the format requirements for delivery to the user, processing moves to routine 814. If the content does not meet the format criteria, the content stream and/or files are routed to the decoder and content formatter 252 by (routine 812) along with the required formatting and coding parameters. At routine 813, the decoder and content formatter 252 decodes the incoming data and may extract digital and/or analog data representing the content and its metadata. The decoder and content formatter 252 then reformats the content into the required formats and coding schemes for delivery to the user. Processing then moves to routine 823 for delivery, which is discussed below when that processing path becomes common to both remote and local content delivery.

Returning to block 803 in FIG. 17A, if the programming content is designated for direct delivery to the user's terminal, the remote content server 204 establishes a communications link with the user terminal 202 (routine 815) and delivers the content files or streams the broadcast program directly to the user terminal 202 (routine 816). After the completed delivery is validated during routine 816, routine 817 logs the delivery fulfillment in the remote server database 260 and notifies the content acquisition server 400 at the aggregator 201 that the requested programming content has been successfully delivered to the user. Processing is then moved to the system administrator 500 (routine 826), which is discussed below, when that processing path becomes common to each delivery type.

If the programming download request is to be fulfilled by the local aggregator 201, execution of the routine 801 passes processing to routine 819 in the local content request processor 451 of the content delivery server 450, which analyzes the programming content's metadata and determines if the content is in the appropriate format and coding scheme for delivery to the user. If the content is determined to meet the format requirements for delivery to the user, processing moves to routine 822. If the format and coding scheme is not correct, execution of the routine 820 retrieves the programming content from the aggregator local storage 254 or the appropriate local streaming sources 262 and routes the programming to the decoder and content formatter 252 along with the required formatting and coding parameters. In routine 821, the decoder and content formatter 252 decodes the incoming data and may extract digital and/or analog data representing the content and its metadata. The decoder and content formatter 252 then reformats the content into the required formats and coding schemes for delivery to the user. Execution of routine 822 takes the correctly coded and formatted programming content file(s) and/or streams, whether directly from local sources or from the decoder and content formatter 252, and routes this content to the content delivery server 450.

Whether the programming content is being delivered by the local aggregator 201 from a remote source or a local source, upon execution of routine 823, the content delivery server 450 analyzes the user's profile information and the content metadata and, if applicable, instructs the digital rights management processor 454 to apply the appropriate DRM scheme to the content delivery. If the DRM scheme involves encrypting the programming content for delivery, the programming content is routed to the encryption processor 455, which processes the digital content data through an encryption algorithm using the appropriate user encryption key and routes the encrypted data back to the content delivery server 450.

The content delivery server 450 then analyzes the metadata and user information, routine 824 and, if applicable, instructs the advertisement processor 456 to incorporate any advertising into the delivery that is appropriate. The advertising is then retrieved from the aggregator local database 501 and packaged with the programming content delivery. In an embodiment, the advertisement processor 456 may have already delivered particular advertising to the user terminal 202 for storage, and having determined this from the user data, may insert a placeholder for an advertisement that will instruct the user terminal 202 to retrieve and display the advertisement at the appropriate time.

Upon execution of routine 825, the content delivery server 450 instructs the communications server 250 to establish a communications link with the user terminal 202 through the wide area distribution system 203, initiating a content reception process 850. The content delivery processor 453 delivers the content to the user terminal 202 (routine 826) through the communications server 250 and wide area distribution system 203. Execution of routine 827 verifies the correct delivery of the programming content to the user, and when the delivery is complete, logs the successful delivery with the system administrator 500. The delivery of content may be done in real-time in the case of broadcast programs and live or scheduled program streams or can be done in non-real-time where the content is delivered at a rate higher than that required for real-time viewing and is stored by the user terminal 202 for playback at a time chosen by the user. (See DAVIC 1.5 Specifications, TV Anytime and TV Anywhere, Revision 6.0; copyright Digital Audio-Visual Council (DAVIC), hereby incorporated by reference, for more detail about concurrent viewing and storing, non-linear playback, non-real-time delivery, and content storage and management.)

Whether the programming was delivered by the local aggregator 201 or by a remote content server 204, processing moves to routine 828 in the system administrator 500, which analyzes the user profile and the content metadata to determine whether the user will be billed or if the content provider is due a fee for the content delivery. If no bills are due, processing ends, routine 829. If billing or fees are applicable, routine 830 routes user information, appropriate content metadata, and content provider information to the system administrator 500, which enters this data into the billing process represented by routine 900.

Prior to content delivery, the programming content may be processed by the coder and content formatter 253 if required to deliver the content in an appropriate digital coding scheme, compression, and content format to the user. The coder and content formatter 253 employs digital compression techniques to increase existing transmission capacity. A number of digital compression algorithms currently exist or may be developed in the future that can achieve the resultant increase in capacity and improved signal quality desired for the system 200. The algorithms generally use one or more of three basic digital compression techniques: (1) within-frame (intraframe) compression, (2) frame-to-frame (interframe) compression, and (3) within carrier compression. The coder and content formatter 253 of the content search, packaging, and delivery system 200 will be able to use any of these techniques in addition to being able to have its capabilities modularly expanded to include any emerging and future techniques that are determined to be desirable.

In an embodiment, although a single digital compression standard may be used for the delivery system 200, different levels of compression can be utilized when delivering programs to a user requesting a particular program. For example, if the program is sent out using an HDTV format, then less compression is used as opposed to sending out the program using a standard video format. The reason is that the HDTV format requires more digital data per portion of content. Since the HDTV format requires more digital data, it will also require more bandwidth to transmit, possibly increasing the cost of delivery. Therefore, the quality of the video delivered may be a variable in the fees charged to users of the system 200.

Since programming content can be delivered in more than one way, the user may also consume the programming in more than one way. Audio/Video Content can be viewed and/or listened to concurrently with the delivery in the case of a broadcast delivery over the cable television system as well as during an Internet delivery of a data stream or file that contains the programming. The user can also store the content as the content is delivered, whether or not the user consumes the content during the delivery, allowing for non-linear playback of content at the user terminal 202 either during delivery or at a later time. Non-linear playback refers to the ability of a user to stop, start, pause, rewind, slowdown, and speedup the playout of a piece of video or audio content. In an embodiment, programming is delivered from the system 200 in less time that it would take to consume the programming and is saved in user local storage 212 for use at any time thereafter. In the case of a real-time broadcast, the storage method may be onto magnetic tape using an audio/video recording system 209 such as a video cassette recorder, or into user local storage 212 as a digital file such as onto a computer hard disk drive or other digital data storage medium. Once the user has numerous programs stored in the user local storage 212, the user terminal 202 will provide the ability for the user to manage content storage and organization through a series of simple GUIs approximating an audio-video library collection. Storage management may also be automated using either user-defined or pre-set rules, or both. (See DAVIC 1.5 Specifications, TV Anytime and TV Anywhere, Revision 6.0; copyright Digital Audio-Visual Council (DAVIC), hereby incorporated by reference, for more detail about concurrent viewing and storing, non-linear playback, non-real-time delivery, and content storage and management.)

In an embodiment, the user terminal 202, whether is comprised of a set top terminal 206, a personal computer terminal 211, or some combination thereof, is integrated into a home network 229 serving the user's home. This will enable the consumption of programming content at numerous nodes in the home which may consist of auxiliary user terminals and/or personal computers with various combinations of video display system 207, audio playout system 208, and audio/video recording system 209. The primary user terminal 202 can route programming search and download requests from other network nodes and route subsequent downloaded programming to the requesting node either an a baseband video network or a digital data network such as an Ethernet network. Auxiliary nodes may also have a combination of user input devices 214 to control the system and initiate programming requests and downloads. In an embodiment, a handheld remote control 225 using wireless radio frequency transmission may control the primary user terminal 202 from a remote location to deliver programming to a remote video display system 207.

The search, packaging, and delivery system 200 may be a revenue generating system for its operators and for registered content providers. In addition to revenue that can be generated from various advertising schemes within the system 200, the system 200 may optionally support a customer-billing model in which users can be billed in different ways. Customer billing schemes include, but are not limited to, term fees for basic services, i.e., monthly billing; subscriptions to various service packages; fees per content download; and total quantity of downloaded material for a given time period. The customer billing server 506 within the system administrator 500 may track services rendered, maintain a user billing account, and track user payments for services. In addition, authorization levels can be set to prevent unauthorized usage. In an embodiment, a single account can have multiple users with different levels of authorization and content access rights. An example is a large family with a single account with each family member having a user profile and attendant usage rights. These usage rights will be administered by the primary user of the account, typically the head of the household.

In order to provide high quality programming content to the user, many of the content providers will be entitled to fees for access to premium content, especially copyrighted content. These fees will be tracked by the content fee and copyright billing server 507 within the system administrator 500. Content providers will be able to register with the 200 using software hosted by the content provider registration server 505 within the system administrator 500. The registration software may collect all relevant data about the content provider and the content provider's proposed content to be made available to users. Using a pre-existing fee table, the provider may be informed of the fees to be made available for the various programming content to be provided. In addition, fees for sufficiently unique content may be negotiated outside the automated registration process. In an embodiment, the content fee and copyright billing server 507 may initiate compensation to content providers at scheduled intervals based on the distribution of content for the prior period.

Part of the registration may include furnishing the content provider with software tools to assist in populating the appropriate metadata fields for new content. For example, an original television show may need to have its program type, description, cast, and other information entered into the metadata database in a manner consistent with that in use by the aggregator 201. In an embodiment, the content provider registration server 505 will run various algorithms to collect this information automatically from differing content providers' databases. In another preferred embodiment, the automatic collection may be augmented by a series of prompt screens for the content provider to manually input the data into the system.

During content registration, and at any time that additional content is made available by the content provider, the content provider can use the content provider registration server 505 services to designate usage rights for programming content. These rights can be assigned to individual pieces of content or to groups or classes of content. Usage rights define how a specific user, or tier of users, can use the digital content when it is delivered to the user terminal 202. The defined usage rights for content are then incorporated into the digital rights management (DRM) scheme that is applied to the content by the content delivery server 450 and may require encryption as part of a secure delivery process. Usage rights either prevent or enable a user to perform certain actions with the digital programming content including, but not limited to, whether content can be recorded or stored, whether the user can make copies of stored content and onto what types of media, whether the content can be played back a finite number of times or indefinitely, whether the content can be spliced, edited, or imported into another digital processing environment, and whether the content can be exported from the system for distribution to a third party.

When content is downloaded to a user, the content delivery server 450 logs the delivery with the database administrator 502, the customer billing server 506, and the content fee and copyright billing server 507. The database administrator 502 incorporates the information into the user profile and the billing servers determine if the user will be charged a fee for the particular content and whether the provider is entitled to a fee for the content.

Users will be able to register with the system 200 using software hosted by the user registration server 504 within the system administrator 500. The user registration software will allow the user to perform numerous tasks including, but not limited to, set up the user's account, choose a billing scheme, select premium content tiers, enter user profile information and preferences, set up multiple user profiles and administer usage rights. At any time in the future, the user can access data that is collected for the user profile and can review and revise user data, opt out of or terminate data collection, request deletion of user data, and review how this data is being used by the system 200.

The invention claimed is:

1. A method for finding and retrieving program content from remote sources in a distributed digital communication network, comprising:
   receiving a program content search request from a user terminal in the network;
   suggesting additional content based on a user's past search criterion or previously downloaded content;
   searching a local content database based on the program content search request;
   searching one or more remote content databases based on the program content search request;
   determining that the program content search request does not yield a matching result with respect to the local content database and the one or more remote content databases;
   maintaining a list of a plurality of active searches based on the program content search request responsive to determining that the program content search request does not yield a matching result with respect to the local content database and the one or more remote content databases;
   identifying one or more programs based on the active searches;
   acquiring one or more of the one or more identified programs from one or more of the local content database and the remote databases responsive to a content change made to at least one of the local content database and the one or more remote content databases, the content change matching at least one of the active searches, if said one or more identified programs has a viewing audience above a predetermined threshold and meets a predetermined selection criterion that rejects specific items;
   receiving a user selection for a program of said acquired one or more of the one or more identified programs; and
   delivering said user selected program to said user terminal.

2. The method of claim 1, wherein the step of receiving the program content search request comprises:
   receiving search criterion from the user terminal;
   processing the received search criterion into a search request form; and
   logging the search criterion into a user local database.

3. The method of claim 2, wherein the search request form comprises:
   a user identification and authorization information;
   a user administration and billing information;
   a search request criteria; and
   a program content type.

4. The method of claim 3, wherein the user identification and authorization information comprises:
   a current user identification;
   an authorization code and password;
   a user network address;
   a public encryption key;
   a digital rights management parameter;
   a preferred content format; and
   a current hardware configuration, wherein the current hardware configuration is provided to a coder and content formatter that formats the search request form for delivery to a user terminal.

5. The method of claim 3, wherein the search criterion is received as a free form question, further comprising:
   applying a search criterion algorithm to parse the free form question;
   analyzing the parsed free form question to identify and categorize significant terms; and
   entering the categorized and identified significant terms into the search request form, wherein a search request processor accesses a lexicon of terms to augment the search request.

6. The method of claim 5, further comprising designating additional search parameters, wherein the additional search parameters are based on a type of query word used in the free form question.

7. The method of claim 1, further comprising:
   decoding the one or more programs received from the remote databases;
   storing the decoded programs;
   encoding the stored programs and the programs from the local content database for delivery to the user terminal; and
   delivering the encoded programs to the user terminal.

8. The method of claim 1, wherein the remote sources are coupled to the user terminal through a wide area distribution system, wherein program content is delivered directly to the user terminal thereby bypassing aggregator.

9. The method of claim 1, wherein the remote sources are coupled to an aggregator through a network gateway.

10. The method of claim 1, further comprising:
    providing a search results list, the search results list including information related to the one or more identified programs; and
    receiving a program acquisition request based on the search results list.

11. The method of claim 1, further comprising:
    crawling the remote sources;
    identifying program content based on one or more completed search requests; and
    acquiring one or more programs based on the identified program content, wherein the acquired programs are stored in an aggregator database.

12. The method of claim 11, wherein identifying program content further comprises using user profile information.

13. The method of claim 12, wherein the user profile information includes one or more of user demographic information, user program viewing history, and user-provided information.

14. The method of claim 1, further comprising verifying that a user is authorized to request the searches.

15. The method of claim 14, wherein when the user is not authorized to request the searches, further comprising notifying the user terminal that the search request is denied.

16. The method of claim 14, further comprising:
    filtering the search request based on a user's profile, wherein the filtering steps apply filters comprising one or more of program content type and program content provider.

17. The method of claim 14, wherein the program content search request includes a free form question, further comprising:
    comparing a supplied search term in the free form question with a database of indexed suggestion keywords;
    determining a relevance of the supplied search term, comprising:
       calculating vector differences of the supplied search term and indexed keywords, thereby creating a list of suggestion key words,
       retrieving a user profile,
       ranking the suggestion keywords based on the user profile, appending the list of suggestion keywords to the search request form, thereby creating an augmented search request form, routing the augmented search request form to a search engine server, and searching content metadata for occurrences of the search criteria.

18. A video and multimedia aggregator for use in a distributed digital communication network, comprising:

means for requesting a search for program content;

means for suggesting content based on a user's past search criterion or previously downloaded content;

means for processing the search request;

means for searching local and remote sources for the program content;

means for acquiring metadata related to the program content;

means for displaying the acquired metadata;

means for receiving a program content download request from a user;

means for determining that the requested program content is currently unavailable at the local and remote sources;

means for maintaining a list of a plurality of active searches based on the requested program content responsive to determining that the requested program content is currently unavailable at the local and remote sources;

means for acquiring the program content in the download request from said user responsive to a content change made to at least one of the local and remote sources, the content change matching at least one of the active searches, if said program content has a viewing audience above a predetermined threshold and meets a predetermined selection criterion that rejects specific items;

means for billing a user of the user terminal;

means for periodically crawling the communications network automatically, thereby retrieving programming information for programs not indexed on the aggregator;

means for receiving a user selection for a program of said acquired one or more of the one or more identified programs; and means for delivering said user selected program to said user terminal.

19. The aggregator of claim 18, wherein the means for requesting the search comprises means for receiving and routing the search request.

20. The aggregator of claim 18, wherein the means for processing the search request, comprises:

means for constructing a search request form;

means for suggesting content to supplement the search request;

and means to provide the search results to the user terminal.

21. The aggregator of claim 18, further comprising means for providing user fees to a content provider.

22. An apparatus comprising:

a processor; and memory storing instructions that, when executed by the processor, cause the apparatus to perform:

receiving a program content search request from a user terminal in a communications network;

suggesting additional content based on a user's past search criterion or previously downloaded content;

searching a local content database based on the program content search request;

searching one or more remote content databases based on the program content search request;

determining that the program content search request does not yield a matching result with respect to the local content database and the one or more remote content databases;

maintaining a list of a plurality of active searches based on the program content search request responsive to determining that the program content search request does not yield a matching result with respect to the local content database and the one or more remote content databases;

identifying one or more programs based on the searches;

acquiring one or more of the one or more identified programs from one or more of the local content database and the remote databases responsive to a content change made to at least one of the local content database and the remote databases, the content change matching at least one of the active searches, if said one or more identified programs has a viewing audience above a predetermined threshold and meets a predetermined selection criterion that rejects specific items;

receiving a user selection for a program of said acquired one or more of the one or more identified programs; and delivering said user selected program to said user terminal.

23. The apparatus of claim 22, wherein the instructions include at least one instruction that, when executed by the processor, causes the apparatus to perform:

decoding the one or more programs received from the remote databases;

storing the decoded programs;

encoding the stored programs and the programs from the local content database for delivery to the user terminal; and delivering the encoded programs to the user terminal.

24. An apparatus comprising:

a request and results processing server; and a search engine server;

wherein the request and results processing server includes a content search suggestion engine configured to suggest programming content based on at least one of a user's past search criterion and previously downloaded content, and wherein the search engine server includes a search engine processor configured to maintain a list of a plurality of active searches based on the user's past search criterion responsive to determining that the user's past search criterion does not yield a matching result with respect to a program content database, and wherein the search engine processor is configured to receive a notification that a change is made to the program content database, and wherein the search engine processor is configured to determine that a match exists between the list of active searches and the change made to the program content database, and wherein the search engine server is configured to forward a notification of the match to the request and results processing server responsive to determining that a match exists between the list of active searches and the change made to the program content database.

25. The apparatus of claim 24, further comprising:

a decoder and content formatter including a decoder processor that is configured to decode programming for storage; and a coder and content formatter including a coder processor that is configured to format the decoded programming for delivery to a user terminal.

26. The apparatus of claim 25, wherein the coder processor formats the programming based on a method of playback at a terminal associated with the user, a type associated with the programming, an indication as to whether the user intends to store the programming at the terminal, and a type and bandwidth of a connection the terminal has with the remote content server.

27. The apparatus of claim 24, further comprising:
a local content storage that is configured to store one or more programs, and wherein the search engine server is configured to first search the local content storage before searching remote sources.

28. The apparatus of claim 24, further comprising:
a communications server coupled to the request and results processing server, wherein the communications server is configured to communicate with one or more user terminals in a digital communication network;
a content acquisition server configured to acquire a program responsive to the search engine processor determining that a match exists between the list of active searches and the change made to the program content database; and
a content delivery server coupled to the communications server, wherein the content delivery server is configured to receive the program from the content acquisition server and provide the program to one or more of the one or more user terminals.

29. The apparatus of claim 24, further comprising:
a content acquisition server configured to acquire a program responsive to the search engine processor determining that a match exists between the list of active searches and the change made to the program content database; and
a network gateway that couples the search engine server and the content acquisition server to one or more remote content sources.

30. The apparatus of claim 24, wherein the request and results processing server comprises:
a request receiver and router configured to retrieve administrative data related to a user and route the retrieved administrative data to a terminal associated with the user;
a content download request processor coupled to the request receiver and router, wherein the content download request processor is configured to route a content download request to a content acquisition server, wherein the content acquisition server is configured to acquire a program responsive to the search engine processor determining that a match exists between the list of active searches and the change made to the program content database;
a search request processor coupled to the request receiver and router and to said content search suggestion engine, wherein the search request processor is configured to receive information related to a search request and route the search request to the search engine server;
a search results form builder configured to create an electronic search request from the information related to the search request; and
a scheduled program prompt and notification processor configured to route a notification that content related to the search request is available to the terminal associated with the user.

31. The apparatus of claim 30, wherein the search results form builder is configured to receive user search results and suggested search results and produce a search results form, the search results form comprising programming, scheduling and availability information, and wherein the search results form builder is configured to provide the search results form to the terminal.

32. The apparatus of claim 31, wherein the search results form further comprises content metadata and identification information.

33. The apparatus of claim 30, wherein the request receiver and router, is configured to open a dialog with a database administrator in response to a user request, and wherein the retrieval and routing of the administrative data is based on the opened dialog with the database administrator.

34. The apparatus of claim 30, wherein the content download request processor is configured to receive content download requests, authorize the download requests, and send the authorized download requests to the content acquisition server.

35. The apparatus of claim 30, wherein the search request processor comprises:
search request processing programs, comprising:
a search term suggestion program, and
a search term comparison program.

36. The apparatus of claim 30, wherein the content notification comprises one or more of an on-screen pop-up window, audible notification, e-mail notification, and automated telephone notification.

37. The apparatus of claim 24, wherein the content search suggestion engine comprises:
a suggestion database processor configured to perform a search within a suggestion database for additional search criterion to suggest the programming content;
a content metadata crawler configured to receive a prompt from the suggestion database processor, wherein the content metadata crawler is configured to search metadata in a local database responsive to the prompt from the suggestion database processor; and
a suggestion keyword indexer configured to receive a listing of the metadata searched by the content metadata crawler in the local database, index the metadata, and assign the metadata with a vector quantity that describes the metadata as suggestion keywords associated with the programming content.

38. The apparatus of claim 37, wherein the suggestion keyword indexer is further configured to populate the suggestion database with the indexed suggestion keywords, wherein an index value indicates a proximity of the metadata within the suggestion database.

39. The apparatus of claim 38, wherein the suggestion database processor comprises a search engine that is configured to search the suggestion database with a user-supplied search criterion and user historical and demographic data to produce a suggested search terms list, wherein search terms in the suggested search terms list are used to create an augmented search request form, and wherein the augmented search request form is provided to the search request processor.

40. The apparatus of claim 38, wherein the suggestion database processor uses the proximity of the metadata to determine a vector relevance of suggestion keywords to search keywords.

41. The apparatus of claim 24, wherein the active searches are based on receipt of a user search request form.

42. The apparatus of claim 41, wherein the search request form comprises:
a user identification and authorization information;
a user administration and billing information;
a search request qualification;
a search request criteria; and
a content type.

43. The apparatus of claim 42, wherein the user identification and authorization information comprises:
a current user identification;
a user network address;
a public encryption key;
digital rights management parameters;
a preferred content format; and
a current hardware configuration, wherein the current hardware configuration is provided to a coder and content formatter that formats the search request form for delivery to a user terminal.

44. The apparatus of claim 42, wherein the search request qualification comprises:
a search request initiation time;
a list of search request content types; and
a search request time limit.

45. The apparatus of claim 44, wherein the list of search request content types allows the user to specify one or more of video, audio, software, text, electronic books, and Websites, wherein the search engine server is configured to return search results based on the list of search result content types.

46. The apparatus of claim 42, wherein the search request criteria comprises:
audio/video programming;
computer software;
electronic book; and
Internet websites.

47. The apparatus of claim 24, wherein the program content database comprises a copy of an aggregator local database, and wherein the search engine server is configured to search the program content database according to a search request form.

48. The apparatus of claim 24, further comprising:
a content acquisition server comprising:
a content request processor and router; and
a remote content download processor, comprising a content buffer, wherein the remote content download processor is configured to cache programming content while managing a download connection to remote content sources over a digital communications network.

49. The apparatus of claim 24, further comprising:
a content delivery server comprising:
a local content request processor configured to initiate delivery of content from local sources,
a digital rights management processor configured to apply a digital rights management (DRM) scheme to the delivered content,
an advertisement processor configured to insert advertising into the delivered content,
a content delivery processor configured to manage the delivery of the delivered content and to validate that the delivered content matches an original content download request, and
an encryption processor configured to encrypt the delivered content.

50. The apparatus of claim 24, further comprising:
a system administrator comprising:
a system administrative server configured to manage communications within the apparatus and manage a list of authorized administration users that manage the apparatus through a set of administration terminals,
a user registration server configured to manage a signup procedure for new users and the termination of user accounts,
a content fee and copyright billing server configured to manage payments of royalties and fees to providers of content,
a user billing server configured to charge a user account when content delivery requires a charge,
a content provider registration server configured to collect registrationo data from a content provider, and
a database administrator configured to maintain a plurality of databases.

* * * * *

UNITED STATES PATENT AND TRADEMARK OFFICE
CERTIFICATE OF CORRECTION

PATENT NO. : 7,793,326 B2  
APPLICATION NO. : 09/920723  
DATED : September 7, 2010  
INVENTOR(S) : John S. McCoskey et al.

Page 1 of 1

It is certified that error appears in the above-identified patent and that said Letters Patent is hereby corrected as shown below:

In Column 36, Claim 50, Line 34:
Please replace "registrationo" with --registration--

Signed and Sealed this
Thirty-first Day of May, 2011

David J. Kappos
*Director of the United States Patent and Trademark Office*